(12) United States Patent
Zacharko et al.

(10) Patent No.: US 12,309,766 B2
(45) Date of Patent: May 20, 2025

(54) POWER SOURCE BASED TRANSMISSION CONTROL

(71) Applicant: QUALCOMM Incorporated, San Diego, CA (US)

(72) Inventors: Michael Aaron Zacharko, Landsdale (AU); Derrick Chu Lin, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 17/894,950

(22) Filed: Aug. 24, 2022

(65) Prior Publication Data

US 2024/0073883 A1 Feb. 29, 2024

(51) Int. Cl.
*H04W 72/12* (2023.01)
(52) U.S. Cl.
CPC .................... *H04W 72/12* (2013.01)
(58) Field of Classification Search
CPC ........... H04W 72/12; H04W 52/0277
See application file for complete search history.

(56) References Cited

U.S. PATENT DOCUMENTS

| 6,256,520 | B1* | 7/2001 | Suzuki | H04W 88/02 455/571 |
| 2009/0146825 | A1 | 6/2009 | Cho | |
| 2013/0301453 | A1* | 11/2013 | Xhafa | H04L 1/0007 370/252 |
| 2014/0028468 | A1* | 1/2014 | Grady | G08C 15/00 340/870.03 |
| 2014/0189061 | A1* | 7/2014 | Stockwell | H04L 67/06 709/218 |
| 2014/0220981 | A1 | 8/2014 | Jheng et al. | |
| 2016/0295516 | A1 | 10/2016 | Su et al. | |
| 2020/0245355 | A1* | 7/2020 | Mueck | H04L 27/2678 |

OTHER PUBLICATIONS

International Search Report and Written Opinion—PCT/US2023/071454—ISA/EPO—Nov. 24, 2023.

* cited by examiner

*Primary Examiner* — Steven Hieu D Nguyen
(74) *Attorney, Agent, or Firm* — Loza & Loza, LLP

(57) ABSTRACT

Aspects relate to transmission control. In some examples, a first apparatus (e.g., a wireless communication device) may output a first packet for transmission to a second apparatus. Subsequently, the first apparatus may suspend a second packet from being output for transmission to the second apparatus. In some examples, the suspension of the second packet may be based on a first voltage level of a power source being less than or equal to a first threshold (e.g., due to the transmission of the first packet).

16 Claims, 16 Drawing Sheets

POWER SOURCE BASED TRANSMISSION CONTROL

TECHNICAL FIELD

The technology discussed below relates generally to wireless communication and, more particularly, to controlling transmissions based on a voltage level of a power source.

INTRODUCTION

Wireless communication networks are widely deployed to provide various communication services. Some of these networks may be multiple access networks that support communication for multiple users by sharing available network resources. For example, a wireless communication device (e.g., a station) may communicate with another wireless communication device (e.g., an access point or a station) of a network to gain access to communication services provided by the network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first apparatus for wireless communication may include a processing system. The processing system may be configured to output a first packet for transmission to a second apparatus. The processing system may also be configured to suspend a second packet from being output for transmission to the second apparatus, the suspension being based on a first voltage level of a power source being less than or equal to a first threshold due to the transmission of the first packet.

In some examples, a method for wireless communication at a first apparatus is disclosed. The method may include outputting a first packet for transmission to a second apparatus. The method may also include suspending a second packet from being output for transmission to the second apparatus, the suspension being based on a first voltage level of a power source being less than or equal to a first threshold due to the transmission of the first packet.

In some examples, a first apparatus for wireless communication may include means for outputting a first packet for transmission to a second apparatus. The first apparatus may also include means for suspending a second packet from being output for transmission to the second apparatus, the suspension being based on a first voltage level of a power source being less than or equal to a first threshold due to the transmission of the first packet.

In some examples, a non-transitory computer-readable medium has stored therein instructions executable by a processing system of a first apparatus to output a first packet for transmission to a second apparatus. The computer-readable medium may also have stored therein instructions executable by the processing system of the first apparatus to suspend a second packet from being output for transmission to the second apparatus, the suspension being based on a first voltage level of a power source being less than or equal to a first threshold due to the transmission of the first packet.

In some examples, a station may include a power source, a transceiver, and a processing system. The transceiver may be configured to transmit a first packet to an apparatus. The processing system may be configured to suspend a second packet from being transmitted to the apparatus, the suspension being based on a first voltage level of the power source being less than or equal to a first threshold due to the transmission of the first packet.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
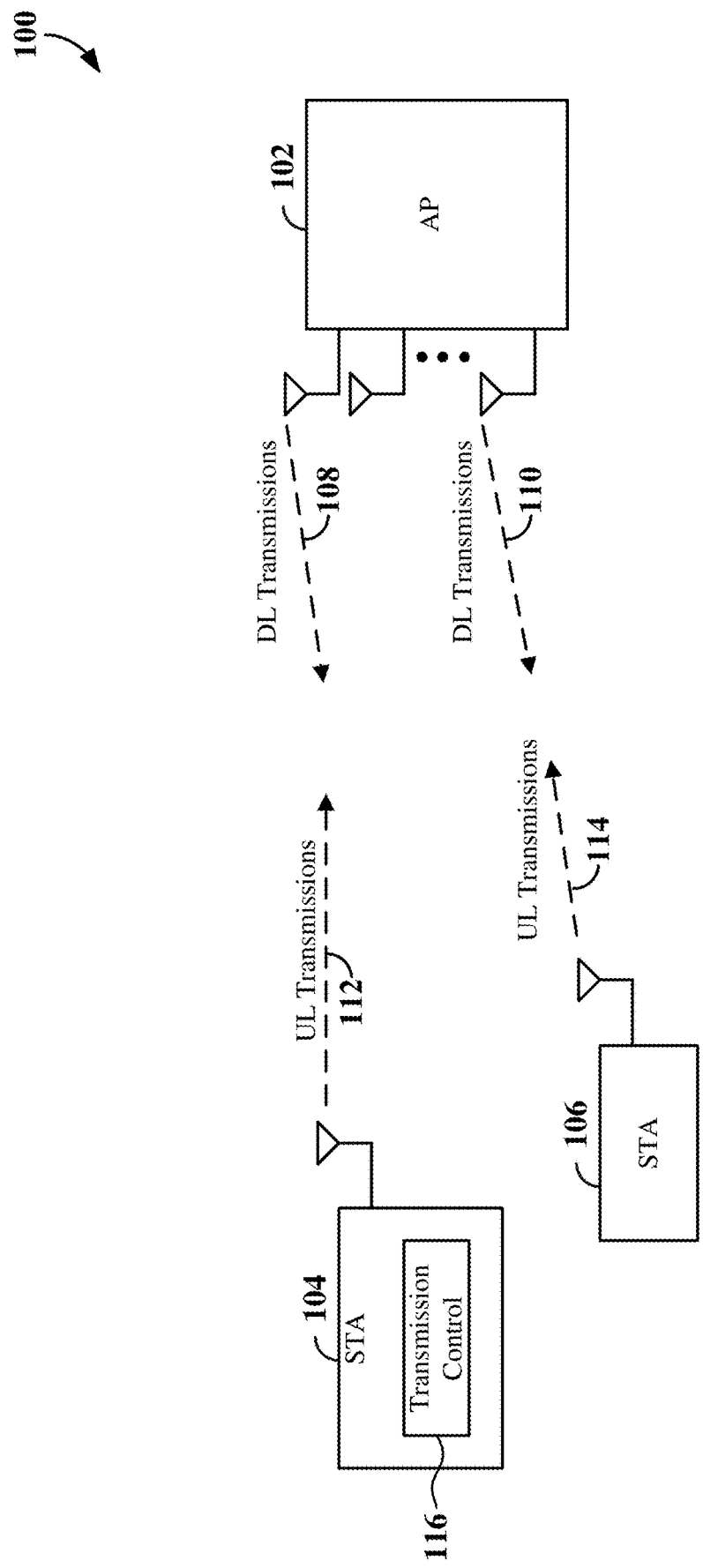
FIG. 1 is a conceptual illustration of an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Various aspects of the disclosure relate to transmission control. For example, a transmission by a wireless communication device may be suspended in the event the output of a power source of the wireless communication device temporarily drops below a threshold level.

In some examples, a wireless communication device (e.g., a low-power device) may determine whether the output voltage of a battery of the wireless communication device has dropped below a first threshold level after the wireless communication device conducts a first transmission. If the output voltage of the battery has dropped below the first threshold level, the wireless communication device may suspend a second transmission.

In some examples, the wireless communication device suspends the second transmission until the output voltage of a battery has recovered to a higher level. For example, the wireless communication device may commence the second transmission upon determining that the output voltage of the battery subsequently exceeds a second threshold level.

In some examples, the wireless communication device suspends the second transmission for a period of time. For example, the wireless communication device may commence the second transmission once a defined period of time has passed following a determination that the output voltage of the battery has dropped below the first threshold level.

FIG. 1 illustrates an example of a wireless communication system 100 where an access point (AP) 102 communicates with a first station (STA) 104 and a second STA 106. In some examples, the AP 102 may correspond to any of the APs or other apparatuses described in any one or more of FIGS. 2, 3, 6, 7, 12, and 13. In some examples, the STAs 104 and 106 may correspond to any of the STAs or other apparatuses described in any one or more of FIGS. 2, 3, 6, 7, 12, and 13.

The AP 102 may transmit downlink (DL) transmissions 108 and 110 to the first STA 104 and the second STA 106, respectively, via one or more links. In addition, the first STA 104 may transmit uplink (UL) transmissions 112 to the AP 102 via one or more links and the second STA 106 may transmit UL transmissions 114 to the AP 102 via one or more links.

The first STA 104 includes a transmission control component 116 that controls transmissions by the first STA 104. In some examples, the transmission control component 116 determines whether the output of a power source of the first STA 104 has dropped below a first threshold level after a first transmission of the UL transmissions 112. If so, the transmission control component 116 may temporarily suspend a second transmission of the UL transmissions 112 (e.g., until the power source recovers).

Figure 2:
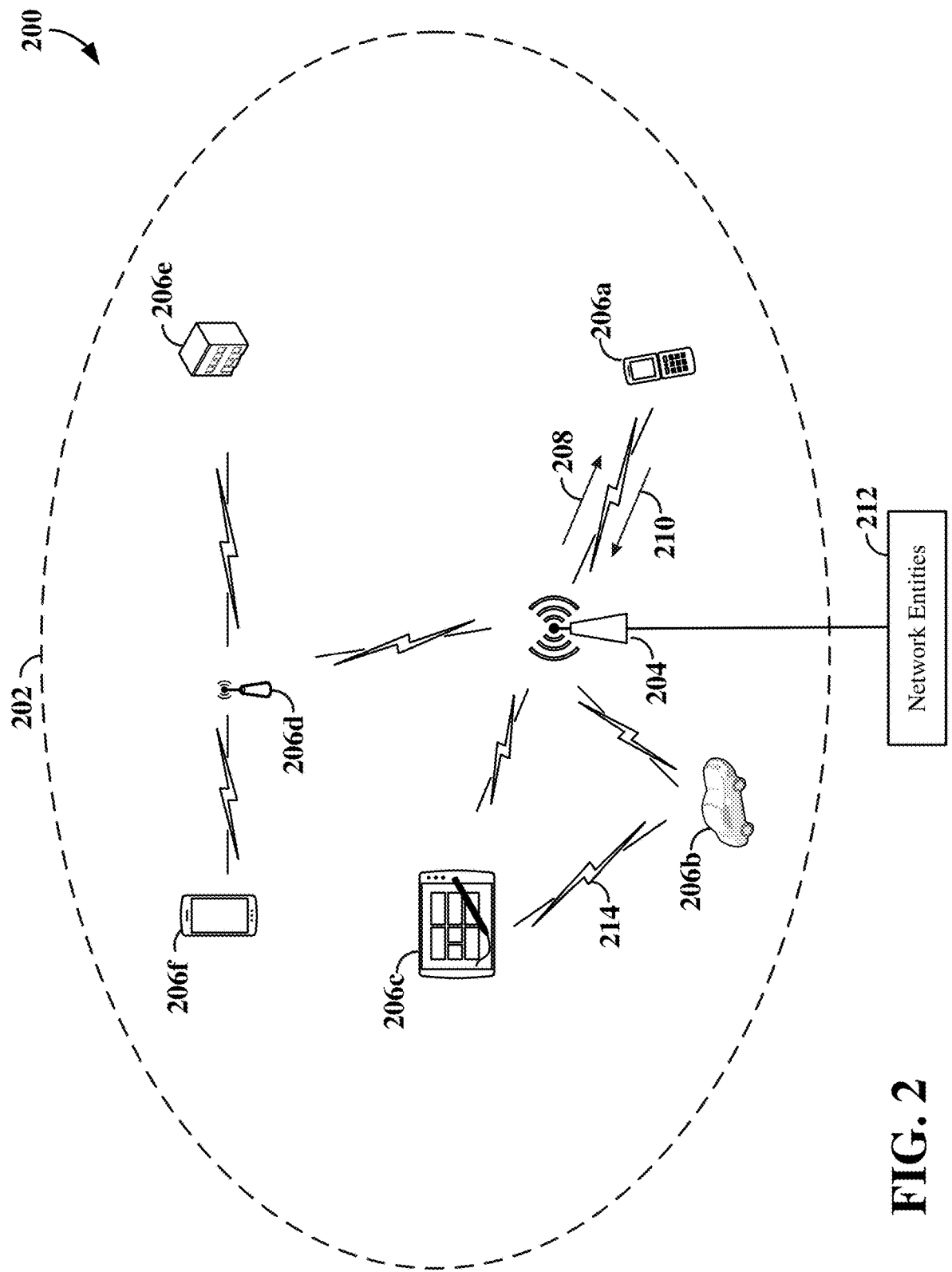
FIG. 2 is a conceptual illustration of another example of a wireless communication system according to some aspects.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a wireless communication system 200 including various wireless communication nodes. For convenience, a wireless communication node may be referred to herein as a wireless node. In some examples, the wireless communication system 200 may operate pursuant to a wireless communication standard, for example, the Institute of Electrical and Electronics Engineers (IEEE) 802.11 standard.

In some examples, a wireless node is a node (e.g., a device, an entity, etc.) that utilizes wireless spectrum (e.g., the radio frequency (RF) spectrum) to communicate with another node. In some examples, a wireless node may be a mobile apparatus. A mobile apparatus may be referred to as a STA in IEEE 802.11, but may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

A mobile apparatus need not necessarily have a capability to move, and may be stationary. The term mobile apparatus or mobile device broadly refers to a diverse array of devices and technologies. Mobile apparatuses may include a number of hardware structural components sized, shaped, and arranged to help in communication. Such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, an asset tracking device, a locationing device, a smart controller (e.g., for home, office, etc.), an automation device (e.g., for home, office, etc.), etc. A mobile apparatus may be a digital home or smart home device such as a home audio, video, and/or multimedia device, an appliance, a vending machine, intelligent lighting, a home security system, a smart meter, etc. A mobile apparatus may be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, the communicated information of which may be given preferential treatment or prioritized access over other types of information, e.g., in terms of prioritized access for transport of critical service data, and/or relevant quality of service (QoS) for transport of critical service data.

In some examples, a wireless node may be an access point. In 802.11, an access point may be a network element in a radio access network responsible for radio transmission and reception in one or more service sets. In different technologies, standards, or contexts, an access point may variously be referred to by those skilled in the art as a base station, a base transceiver station (BTS), a radio base station, a radio transceiver, a transceiver function, a basic service set (BSS), an extended service set (ESS), a Node B (NB), an eNode B (eNB), a gNode B (gNB), a transmission and reception point (TRP), or some other suitable terminology.

In the example of FIG. 2, an access point (AP) 204 is deployed in a network to provide access to one or more services (e.g., network connectivity) for one or more stations (STAs) such as the STAs 206a, 206b, 206c, 206d, 206e, and 206f (which may be referred to herein collectively as STAs 206 or separately as a STA 206) that may be installed within or that may roam throughout a coverage area of the network. Thus, at various points in time, a STA 206 may connect to the AP 204 or to some other access point in the network (not shown). In some examples, the AP 204 may be referred to as an AP STA. In some examples, the STAs 206 may be referred to as non-AP STAs.

A variety of processes and methods may be used for transmissions in the wireless communication system 200 between the AP 204 and the STAs 206. For example, signals may be sent and received between the AP 204 and the STAs 206 in accordance with orthogonal frequency-division multiplexing (OFDM) and orthogonal frequency-division multiple access (OFDMA) techniques. In this case, the wireless communication system 200 may be referred to as an OFDM/OFDMA system. However, within the scope of the disclosure, multiplexing and multiple access are not limited to the above schemes, and may be provided utilizing time division multiple access (TDMA), code division multiple access (CDMA), frequency division multiple access (FDMA), spatial division multiple access (SDMA), sparse code multiple access (SCMA), resource spread multiple access (RSMA), or other suitable multiple access schemes.

A communication link that facilitates transmission from the AP 204 to one or more of the STAs 206 may be referred to as a downlink (DL) (e.g., the downlink 208), and a communication link that facilitates transmission from one or more of the STAs 206 to the AP 204 may be referred to as an uplink (UL) (e.g., the uplink 210). Alternatively, a downlink 208 may be referred to as a forward link or a forward channel, and an uplink 210 may be referred to as a reverse link or a reverse channel. Other terminology may be used for these links in other examples.

The AP 204 may act as a base station and provide wireless communication coverage in a basic service area (BSA) 202. The AP 204 along with the STAs 206 associated with the AP 204 and that use the AP 204 for communication may be referred to as a basic service set (BSS).

The AP 204 and each STA 206 may exchange data units that can include control information and/or data. At the physical (PHY) layer, such a data unit may be referred to as a physical layer protocol data unit (PPDU). In some aspects, a PPDU may be referred to as a packet or physical layer packet. Each PPDU may include a preamble and a payload. The preamble may include at least one training field (e.g., used for synchronization) and at least one signaling (SIG) field (e.g., used for control signaling). The payload may include a medium access control (MAC) header or data for other layers, and/or user data, for example. The payload may be transmitted using one or more data symbols. The systems, methods, and devices herein may utilize data units with training fields whose peak-to-power ratio has been minimized.

The wireless communication system 200 may employ methods to allow efficient access of the wireless communication medium based on unpredictable data transmissions while avoiding collisions. For example, to gain access to a channel, a device in the wireless communication system 200 may support a medium access control (MAC) distributed coordination function (DCF) that employs a carrier sense multiple access/collision avoidance (CSMA/CA) procedure. Other types of access schemes may be used in other examples. More generally, a device (e.g., an AP or a STA) having data for transmission senses the wireless communication medium to determine if the channel is already occupied. If the device senses the channel is idle, the device may transmit its data. Otherwise, the device may defer for some period before determining again whether or not the wireless communication medium is free for transmission. A method for performing a CSMA/CA procedure may employ various gaps between consecutive transmissions to avoid collisions.

In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than a transmission that must wait longer before attempting to access the channel.

Some wireless communication systems (e.g., based on IEEE 802.11ax) employ a target wait time (TWT) mechanism that schedules STAs to transmit or receive on a wireless communication medium at certain times. This allows a STA to switch to a low power mode when the STA is not actively transmitting or receiving information. Thus, the STA may save power (outside of its scheduled transmit or receive times). In addition, the use of TWT scheduling may enable the BSS (e.g., an AP) to manage traffic more efficiently (e.g., by preventing communication collisions between STAs, by prioritizing traffic, and so on).

In some examples (e.g., if one or more of the STAs 206e and 206f are out of the range of the AP 204 or otherwise have difficulty communicating with the AP 204), a STA 206d may be configured as a relay device. For example, the STA 206d may be configured (e.g., with STA and AP functionality) to relay communication between the AP 204 and the STA 206e and to relay communication between the AP 204 and the STA 206f.

In some implementations, a wireless communication network might not have a central AP 204, but rather may function as a peer-to-peer network between the STAs 206. Accordingly, the functions of the AP 204 described herein may be performed by one or more of the STAs 206 in some examples. Also, in some examples, a STA may connect to a network served by an AP and also establish a peer-to-peer network with another STA.

For example, the STA 206b may communicate with the STA 206c via signaling 214 to form a peer-to-peer network. In this case, the STAs 206b and 206c may be referred to as a peer STAs. In some examples, the communication between the STAs 206b and 206c may operate pursuant to a wireless communication standard (e.g., the IEEE 802.11 standard or some other standard). For example, a first peer STA that has data to transmit to a second peer STA may perform a CSMA/CA procedure to gain access to a channel. In addition, the peer STAs may transmit data units that conform to the 802.11 standard (e.g., the data units include headers and payloads that conform to a specific version of the standard).

Access points in a network may communicate with one or more network entities (represented, for convenience, by network entities 212 in FIG. 2), including each other, to facilitate wide area network connectivity. A network entity may take various forms such as, for example, one or more radio and/or core network entities. Thus, in various implementations the network entities 212 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

Figure 3:
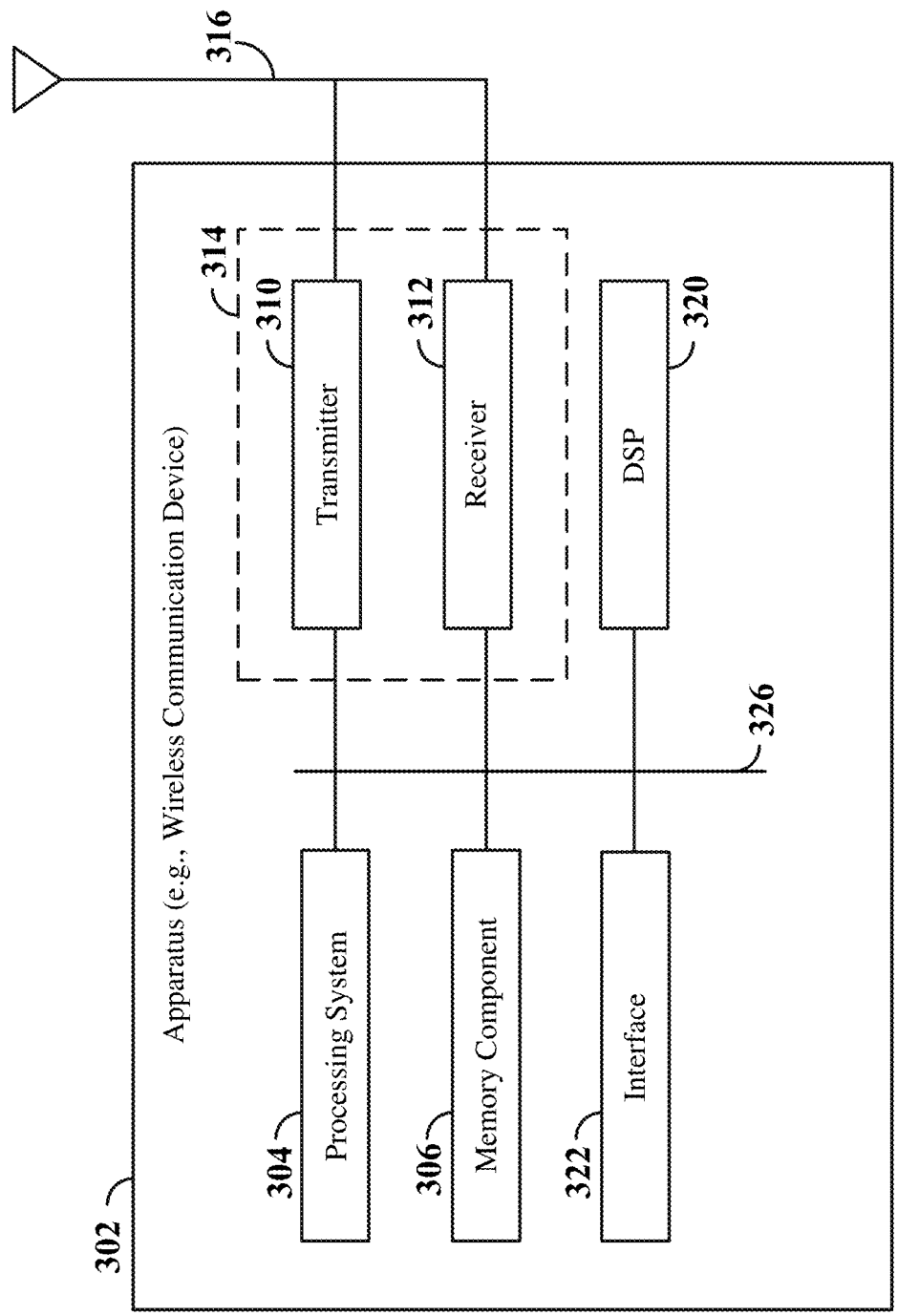
FIG. 3 is a block diagram of an example of an apparatus (e.g., a wireless communication device) according to some aspects.

FIG. 3 illustrates several components of an apparatus (e.g., a wireless node) 302 that may be deployed within the wireless communication system 200. The apparatus 302 is an example of a device that may be configured to implement the various methods described herein. For example, the apparatus 302 may be implemented as the AP 204, a relay (e.g., the STA 206d), or one of the other STAs 206 of FIG. 2. In some examples, the apparatus 302 may correspond to any of the apparatuses, APs, ATs, STAs, transmitting devices, or receiving devices shown in any of FIGS. 1, 2, 6, 7, 12, and 13.

The apparatus 302 may include a processing system 304 that controls operation of the apparatus 302. The processing system 304 may also be referred to as a central processing unit (CPU). A memory component 306 (e.g., including at least one memory device), which may include both read-only memory (ROM) and random access memory (RAM), provides instructions and data to the processing system 304. A portion of the memory component 306 may also include non-volatile random access memory (NVRAM). The processing system 304 typically performs logical and arithmetic operations based on program instructions stored within the memory component 306. The instructions in the memory component 306 may be executable to implement the methods described herein. In some aspects, the processing system 304 and the memory component 306 of FIG. 6 may correspond to the processing system 1314 of FIG. 13.

When the apparatus 302 is implemented or used as a transmitting node, the processing system 304 may be configured to select one of a plurality of medium access control (MAC) header types, and to generate a packet having that MAC header type. For example, the processing system 304 may be configured to generate a packet including a MAC header and a payload and to determine what type of MAC header to use.

When the apparatus 302 is implemented or used as a receiving node, the processing system 304 may be configured to process packets of a plurality of different MAC header types. For example, the processing system 304 may be configured to determine the type of MAC header used in a packet and process the packet and/or fields of the MAC header.

The processing system 304 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 304 to perform the various functions described herein.

The apparatus 302 may also include a housing that may include a transmitter 310 and a receiver 312 to allow transmission and reception of data between the apparatus 302 and a remote location. The transmitter 310 and receiver 312 may be combined into single communication device (e.g., a transceiver 314). In some implementations (e.g., where the transceiver 314 is an RF transceiver), an antenna 316 may be attached to the housing and electrically coupled to the transceiver 314. The apparatus 302 may also include (not shown) multiple transmitters, multiple receivers, multiple transceivers, and/or multiple antennas. The transmitter 310 and the receiver 312 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 310 may be configured to wirelessly transmit packets according to one or more MAC header types (e.g., corresponding to different versions of the 802.11 standard). For example, the transmitter 310 may be configured to transmit packets with the type of header generated by the processing system 304, discussed above.

The receiver 312 may be configured to wirelessly receive packets having one or more MAC header types. In some aspects, the receiver 312 is configured to detect a particular type of a MAC header and process the packet accordingly.

The receiver 312 may be used to detect and quantify the level of signals received by the transceiver 314. The receiver 312 may detect such signals as total energy, energy per subcarrier per symbol, power spectral density, or in some other manner. The apparatus 302 may also include a digital signal processor (DSP) 320 for use in processing signals. In some examples, the DSP 320 may be configured to generate a data unit for transmission. In some aspects, the data unit may include (e.g., may be) a physical layer data unit (PPDU). In some aspects, a PPDU may be referred to as a packet.

The apparatus 302 may further include an interface 322. In examples where the interface 322 is a user interface, the interface 322 may include (e.g., may be) a keypad, a microphone, a speaker, a display, and/or the like. Such a user interface may include any element or component that conveys information to a user of the apparatus 302 and/or receives input from the user.

The various components of the apparatus 302 may be coupled together by a bus system 326. The bus system 326 may include a data bus, for example, as well as a power bus, a control signal bus, and a status signal bus in addition to the data bus. Those of skill in the art will appreciate the components of the apparatus 302 may be coupled together or accept or provide inputs to each other using some other mechanism.

In some examples, the apparatus 302 may be an integrated circuit. In some examples, the apparatus 302 may be configured to operate in a wireless node (e.g., an AP or a STA) and to perform one or more of the operations described herein.

In some implementations, the apparatus 302 communicates with at least one other apparatus (not shown) via the interface 322. To this end, in some implementations, the interface 322 (e.g., a send/receive interface) may be coupled to the processing system 304 for outputting and/or obtaining (e.g., sending and/or receiving) information (e.g., received information, generated information, decoded information, messages, etc.) between the processing system 304 and the other apparatus. In some implementations, the interface 322 may include an interface bus, bus drivers, bus receivers, other suitable circuitry, or a combination thereof. In some implementations, the interface 322 may include radio frequency (RF) circuitry (e.g., an RF transmitter and/or an RF receiver).

Thus, the apparatus 302 may communicate with other apparatuses in various ways. In some examples, the apparatus may transmit and receive information (e.g., a frame, a message, bits, etc.) via RF signaling. In some cases, rather than transmitting information via RF signaling, the apparatus 302 may use the interface 322 to provide (e.g., output, send, transmit, etc.) information for RF transmission. For example, the processing system 304 may output information, via a bus interface, to an RF front end for RF transmission. Similarly, rather than receiving information via RF signaling, the apparatus 302 may use the interface 322 to obtain information that is received by another apparatus. For example, the processing system 304 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Although a number of separate components are illustrated in FIG. 3, one or more of the components may be combined or commonly implemented. For example, the processing system 304 may be used to implement not only the functionality described above with respect to the processing system 304, but also to implement the functionality described above with respect to the transceiver 314 and/or the DSP 320. Each of the components illustrated in FIG. 3 may be implemented using a plurality of separate elements. Furthermore, the processing system 304 may be used to implement any of the components, modules, circuits, or the like described below, or each may be implemented using a plurality of separate elements.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 3 may be implemented by processor and memory component(s) of the apparatus (e.g., by execution of appropriate code and/or by appropriate configuration of processor components). It should be appreciated that these components may be implemented in different types of apparatuses in different implementations (e.g., in an application-specific integrated circuit (ASIC), in a system-on-a-chip (SoC), etc.).

A device (e.g., the apparatus 302) operating in the wireless communication system 200 may implement only functionality of a transmitting node, only functionality of a receiving node, or functionality of both a transmitting node and a receive node. For ease of reference, when discussing the apparatus 302 operating as a transmitting node, it may be hereinafter referred to as an apparatus 302t Similarly, when discussing the apparatus 302 operating as a receiving node, it may be hereinafter referred to as an apparatus 302r.

Figure 4:
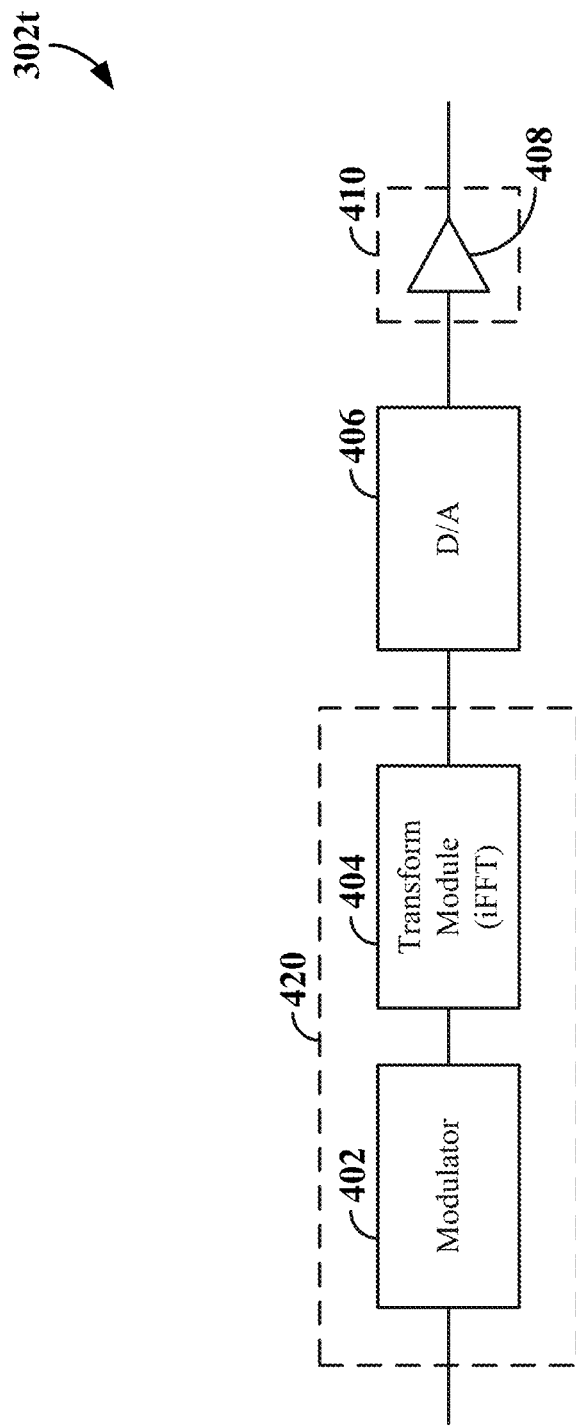
FIG. 4 is a block diagram of example components of the apparatus of FIG. 3 that may be used to transmit wireless communication signals according to some aspects.

FIG. 4 illustrates various components that may be utilized in the apparatus 302t to transmit wireless communication. The components illustrated in FIG. 4 may be used, for example, to transmit OFDM communication. In some examples, the components illustrated in FIG. 4 are used to generate and transmit packets to be sent over a bandwidth of less than or equal to 1 MHz. In some examples, the components illustrated in FIG. 4 are used to generate and transmit packets to be sent over a bandwidth of greater than or equal to 1 MHz.

The apparatus 302t of FIG. 4 may include a modulator 402 configured to modulate bits for transmission. For example, the modulator 402 may determine a plurality of symbols from bits received from the processing system 304 (FIG. 3) or the interface 322 (FIG. 3), for example by mapping bits to a plurality of symbols according to a constellation. The bits may correspond to user data or to control information. In some aspects, the bits are received in codewords. In one example, the modulator 402 may include (e.g., may be) a QAM (quadrature amplitude modulation) modulator, for example, a 16-QAM modulator or a 64-QAM modulator. In other examples, the modulator 402 may include (e.g., may be) a binary phase-shift keying (BPSK) modulator, a quadrature phase-shift keying (QPSK) modulator, or an 8-PSK modulator. Other types of modulators may be used in other examples.

The apparatus 302t may further include a transform module 404 configured to convert symbols or otherwise modulated bits from the modulator 402 into a time domain. In FIG. 4, the transform module 404 is illustrated as being implemented by an inverse fast Fourier transform (IFFT) module. Other types of transform modules may be used in other examples. In some implementations, there may be multiple transform modules (not shown) that transform units of data of different sizes. In some implementations, the transform module 404 may be itself configured to transform units of data of different sizes. For example, the transform module 404 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 24 points are used to convert symbols being transmitted over 24 tones into a time domain The number of points used by the transform module 404 may be referred to as the size of the transform module 404.

In FIG. 4, the modulator 402 and the transform module 404 are illustrated as being implemented in a DSP 420. In some examples, however, one or both of the modulator 402 and the transform module 404 may be implemented in the processing system 304 of FIG. 3 or in another element of the apparatus 302t.

As discussed above, the DSP 420 may be configured to generate a data unit for transmission. In some aspects, the modulator 402 and the transform module 404 may be configured to generate a data unit including a plurality of fields including control information and a plurality of data symbols.

The apparatus 302t may further include a digital to analog converter (D/A) 406 configured to convert the output of the transform module into an analog signal. For example, the time-domain output of the transform module 404 may be converted to a baseband OFDM signal by the digital to analog converter 406. The digital to analog converter 406 may be implemented in the processing system 304 or in another element of the apparatus 302 of FIG. 3. In some aspects, the digital to analog converter 406 is implemented in the transceiver 314 of FIG. 3 or in a data transmit processor.

The analog signal may be wirelessly transmitted by a transmitter 410. The analog signal may be further processed before being transmitted by the transmitter 410, for example by being filtered or by being upconverted to an intermediate or carrier frequency. In the example illustrated in FIG. 4, the transmitter 410 includes a transmit amplifier 408. Prior to being transmitted, the analog signal may be amplified by the transmit amplifier 408. In some examples, the amplifier 408 may include a low noise amplifier (LNA).

The transmitter 410 is configured to transmit one or more packets or data units in a wireless signal based on the analog input signal. The data units may be generated using the processing system 304 of FIG. 3 and/or the DSP 420, for example using the modulator 402 and the transform module 404 as discussed above. Data units that may be generated and transmitted as discussed above are described in additional detail herein.

Figure 5:
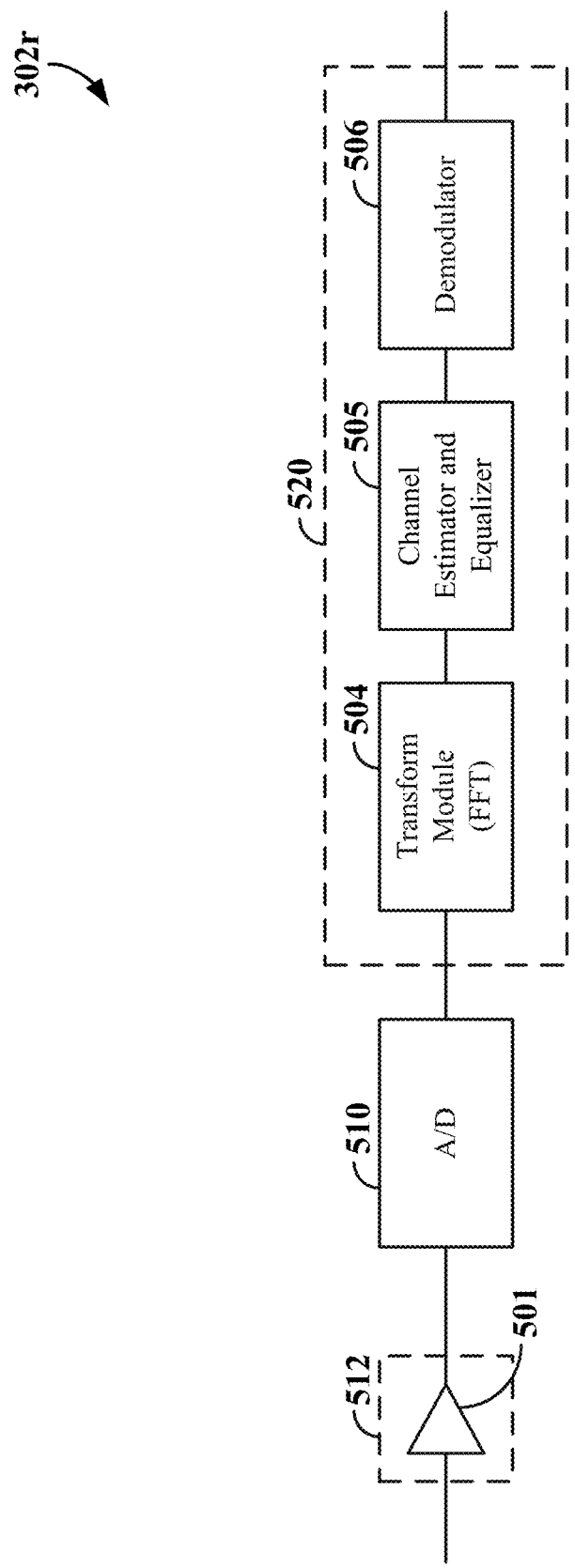
FIG. 5 is a block diagram of example components of the apparatus of FIG. 3 that may be used to receive wireless communication signals according to some aspects.

FIG. 5 illustrates various components that may be utilized in the apparatus 302r to receive wireless communication. The components illustrated in FIG. 5 may be used, for example, to receive OFDM communication. For example, the components illustrated in FIG. 5 may be used to receive data units transmitted by the components such as those discussed above with respect to FIG. 4.

A receiver 512 of apparatus 302r is configured to receive one or more packets or data units in a wireless signal. These data units may be received and decoded or otherwise processed as discussed below.

In the example illustrated in FIG. 5, the receiver 512 includes a receive amplifier 501. The receive amplifier 501 may be configured to amplify the wireless signal received by the receiver 512. In some examples, the receiver 512 is configured to adjust the gain of the receive amplifier 501 using an automatic gain control (AGC) function. In some aspects, the automatic gain control uses information in one or more training fields of a received data unit, such as a short training field (STF) for example, to adjust the gain. Those having ordinary skill in the art will understand methods for performing AGC. In some aspects, the amplifier 501 may include an LNA.

The apparatus 302r includes an analog to digital converter (A/D) 510 configured to convert the amplified wireless signal from the receiver 512 into a digital representation thereof. Further to being amplified, the wireless signal may be processed (e.g., by the receiver 512) before being converted by the analog to digital converter 510, for example by being filtered or by being downconverted to an intermediate or baseband frequency. The analog to digital converter 510 may be implemented in the processing system 304 of FIG. 3 or in another element of the apparatus 302r. In some examples, the analog to digital converter 510 is implemented in the transceiver 314 of FIG. 3 or in a data receive processor.

The apparatus 302r may further include a transform module 504 configured to convert the representation of the wireless signal into a frequency spectrum. In FIG. 5, the transform module 504 is illustrated as being implemented by a fast Fourier transform (FFT) module. In some aspects, the transform module 504 may identify a symbol for each point that it uses. As described above with reference to FIG. 4, the transform module 504 may be configured with a plurality of modes, and may use a different number of points to convert the signal in each mode. The number of points used by the transform module 504 may be referred to as the size of the transform module 504. In some aspects, the transform module 504 may identify a symbol for each point that it uses. Other types of transform modules may be used in other examples.

The apparatus 302r may further include a channel estimator and equalizer 505 configured to form an estimate of the channel over which the data unit is received, and to remove certain effects of the channel based on the channel estimate. For example, the channel estimator and equalizer 505 may be configured to approximate a function of the channel, and the channel equalizer may be configured to apply an inverse of that function to the data in the frequency spectrum.

The apparatus 302r may further include a demodulator 506 configured to demodulate the equalized data. For example, the demodulator 506 may determine a plurality of bits from symbols output by the transform module 504 and the channel estimator and equalizer 505, for example by reversing a mapping of bits to a symbol in a constellation. The bits may be processed or evaluated by the processing system 304 of FIG. 3, or used to display or otherwise output information to the interface 322 of FIG. 3. In this way, data and/or information may be decoded. In some aspects, the bits correspond to codewords. In one example, the demodulator 506 may include a quadrature amplitude modulation (QAM) demodulator, for example an 8-QAM demodulator or a 64-QAM demodulator. In other aspects, the demodulator 506 may include a binary phase-shift keying (BPSK) demodulator or a quadrature phase-shift keying (QPSK) demodulator. Other types of demodulators may be used in other examples.

In FIG. 5, the transform module 504, the channel estimator and equalizer 505, and the demodulator 506 are illustrated as being implemented in the DSP 520. In some examples, however, one or more of the transform module 504, the channel estimator and equalizer 505, and the demodulator 506 may be implemented in the processing system 304 of FIG. 3 or in another element of the apparatus 302 of FIG. 3.

As discussed above, the wireless signal received at the receiver 312 may include one or more data units. Using the functions or components described above, the data units or data symbols therein may be decoded evaluated or otherwise evaluated or processed. For example, the processing system 304 of FIG. 3 and/or the DSP 520 may be used to decode data symbols in the data units using the transform module 504, the channel estimator and equalizer 505, and the demodulator 506.

The apparatus 302t shown in FIG. 4 is an example of a single transmit chain used for transmitting via an antenna. The apparatus 302r shown in FIG. 5 is an example of a single receive chain used for receiving via an antenna. In some implementations, the apparatus 302t or 302r may implement a portion of a multiple-input multiple-output (MIMO) system that uses multiple antennas to simultaneously transmit data via multiple streams and/or receive simultaneously transmit data via multiple streams.

Figure 6:
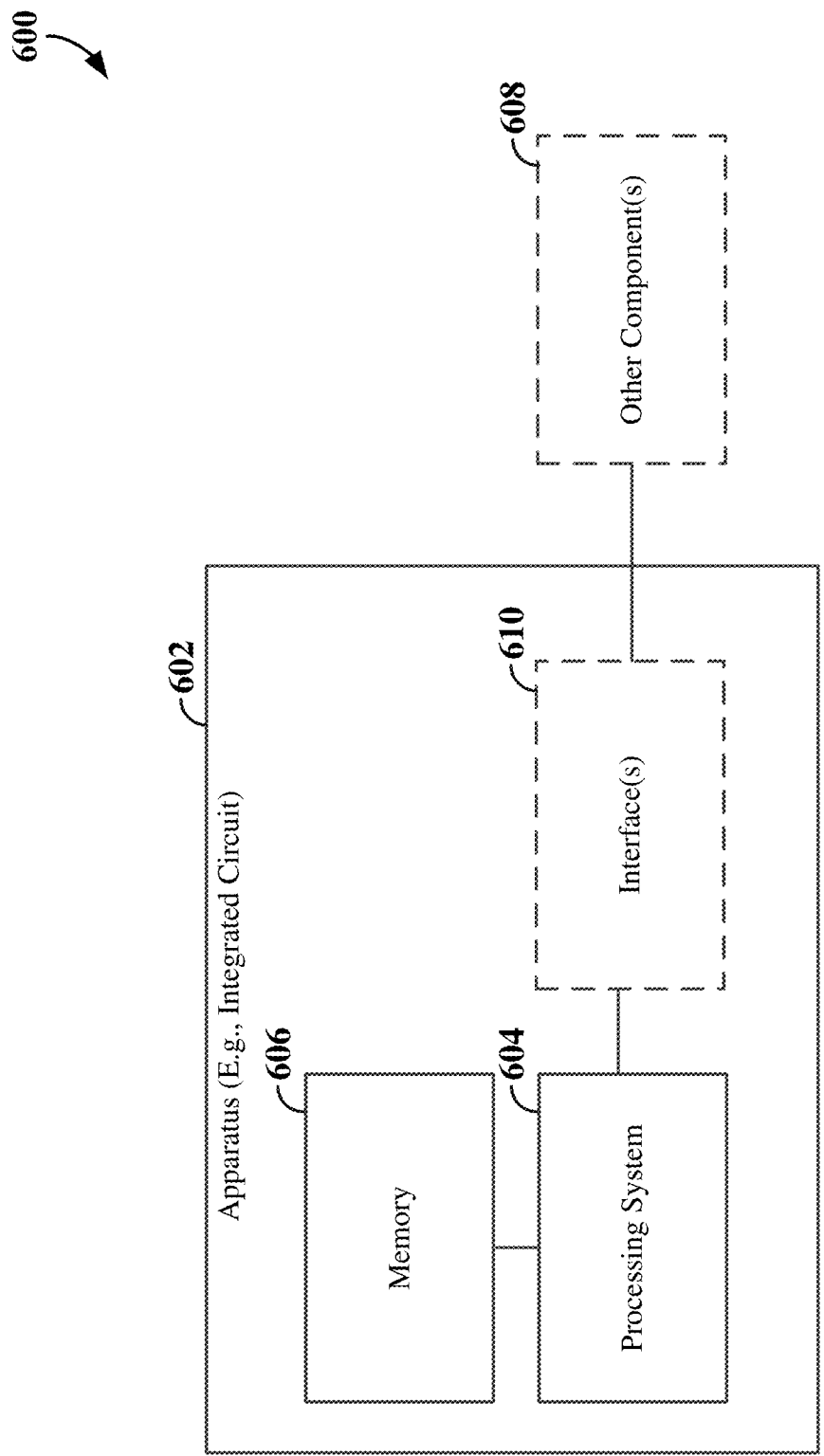
FIG. 6 is a block diagram of an example of an apparatus (e.g., an integrated circuit) according to some aspects.

FIG. 6 illustrates an example apparatus 600 according to certain aspects of the disclosure. In some examples, the apparatus 600 may be an AP, an AT, or some other type of wireless node (e.g., a node that utilizes wireless spectrum (e.g., the RF spectrum) to communicate with another node or entity). In some examples, the apparatus 600 may correspond to any of the apparatuses, APs, ATs, STAB, transmitting devices, or receiving devices shown in any of FIGS. 1, 2, 3, 7, 12, and 13.

The apparatus 600 includes an apparatus 602 (e.g., an integrated circuit) and, optionally, at least one other component 608. In some examples, the apparatus 602 may be configured to operate in a wireless node (e.g., an AP, AT, a STA, etc.) and to perform one or more of the operations described herein. The apparatus 602 includes a processing system 604, and a memory 606 coupled to the processing system 604. Example implementations of the processing system 604 are provided herein. In some aspects, the processing system 604 and the memory 606 of FIG. 6 may correspond to the processing system 1314 of FIG. 13.

The processing system 604 is generally adapted for processing, including the execution of such programming stored on the memory 606. For example, the memory 606 may store instructions that, when executed by the processing system 604, cause the processing system 604 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 602 communicates with at least one other component (e.g., a component 608 external to the apparatus 602) of the apparatus 600. To this end, in some implementations, the apparatus 602 may include at least one interface 610 (e.g., a send and/or receive interface) coupled to the processing system 604 for outputting and/or obtaining (e.g., sending and/or receiving) information (e.g., received information, generated information, decoded information, messages, etc.) between the processing system 604 and the other component(s) 608. In some implementations, the interface 610 may include an interface bus, bus drivers, bus receivers, buffers, other suitable circuitry, or a combination thereof. In some implementations, the interface 610 may include radio frequency (RF) circuitry (e.g., an RF transmitter and/or an RF receiver). In some implementations, the interface 610 may be configured to interface the apparatus 602 to one or more other components of the apparatus 600 (other components not shown in FIG. 6). For example, the interface 610 may be configured to interface the processing system 604 to a radio frequency (RF) front end (e.g., an RF transmitter and/or an RF receiver).

The apparatus 602 may communicate with other apparatuses in various ways. In cases where the apparatus 602 includes an RF transceiver (not shown in FIG. 6), the apparatus may transmit and receive information (e.g., a frame, a message, bits, etc.) via RF signaling. In some cases, rather than transmitting information via RF signaling, the apparatus 602 may have an interface to provide (e.g., output, send, transmit, etc.) information for RF transmission. For example, the processing system 604 may output information, via a bus interface of the processing system 604, to an RF front end for RF transmission. Similarly, rather than receiving information via RF signaling, the apparatus 602 may have an interface to obtain information that is received by another apparatus. For example, the processing system 604 may obtain (e.g., receive) information, via a bus interface of the processing system 604, from an RF receiver that received the information via RF signaling. In some implementations, an interface may include multiple interfaces. For example, a bidirectional interface may include a first interface for obtaining and a second interface for outputting.

Figure 7:
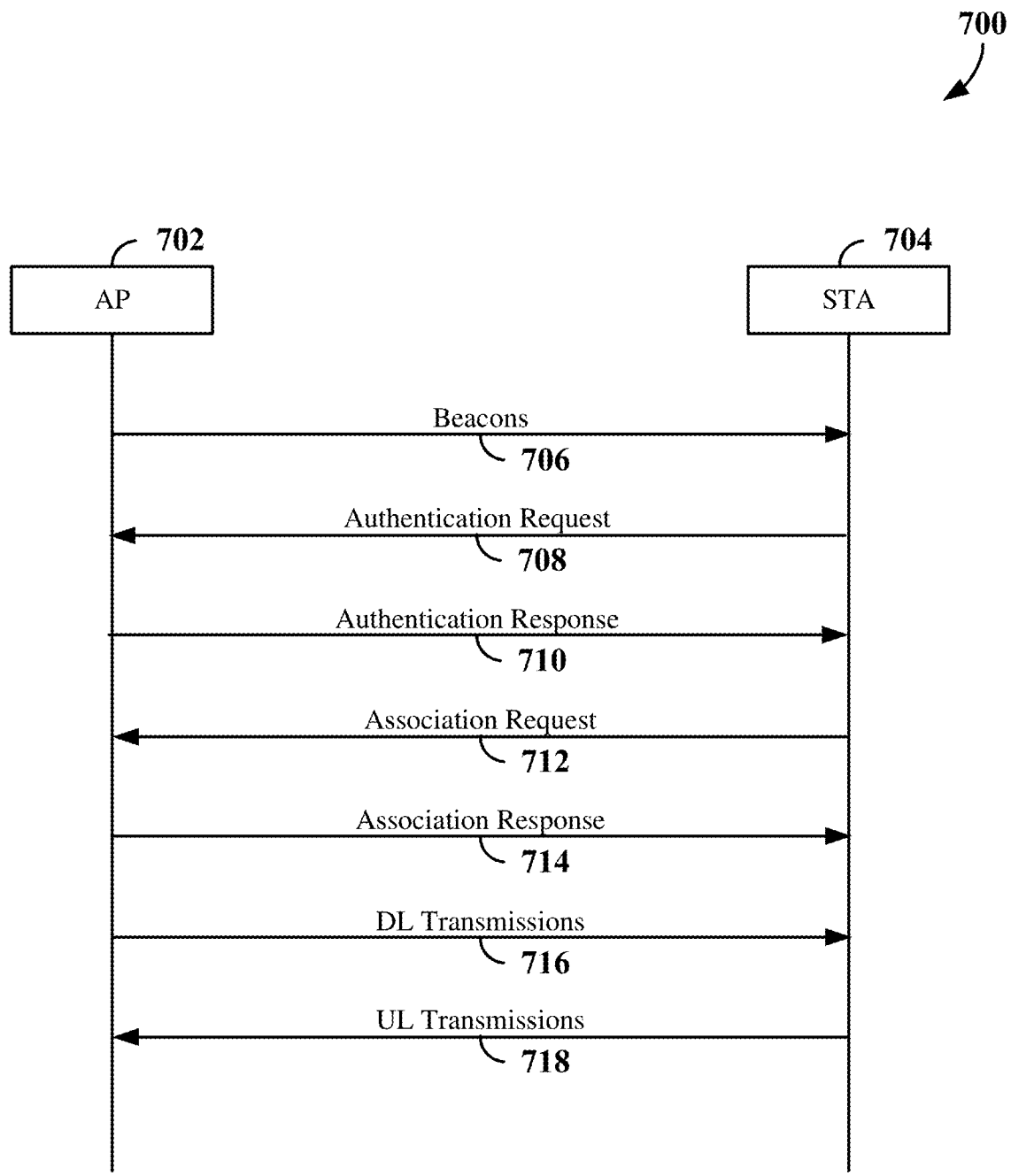
FIG. 7 is a signaling diagram illustrating an example of signaling between an access point and a station according to some aspects.

In an IEEE 802.11-based network, a STA can gain network access via an authentication and association procedure. FIG. 7 illustrates an example of authentication/association signaling in a wireless communication system 700 including an access point (AP) 702 and a station (STA) 704. In some examples, the AP 702 may correspond to any of the APs or other apparatuses described in any one or more of FIGS. 1, 2, 3, 6, 12, and 13. In some examples, the STA 704 may correspond to any of the STAs or other apparatuses described in any one or more of FIGS. 1, 2, 3, 6, 12, and 13.

At #706 of FIG. 7, the AP 702 transmits management frames including beacons on designated RF bands. In some examples, these so-called beacon frames may be transmitted at intervals referred to as target beacon transmission times (TBTTs). In some examples, a beacon frame may include information such as the service set identifiers (SSIDs), basic SSIDs (BSSIDs), security capability, TBTT, RF channels (bands), traffic indication map (TIM), delivery TIM (DTIM), and connection speeds supported or used by the AP 702.

In some examples, a beacon frame may include timing information relating to a timing synchronization (TSF). An AP may use a TSF to maintain timing synchronization between the AP and any STAs that are communicating with the AP. For example, the AP and each STA may operate a timer (e.g., that increments every microsecond). In addition, the AP may repeatedly (e.g., periodically) broadcast TSF information (e.g., a TSF value) that enables the timers of the STAs to maintain synchronization with the timer of the AP.

Upon receiving a beacon from the AP 702, the STA 704 may attempt to access to a basis service set (BSS) of the AP 702. Thus, at #708, the STA 704 sends a management frame including an authentication request to the AP 702 on one of the RF channels supported by the AP 702. In some examples, this authentication request includes an identifier of the STA 704 (e.g., a MAC address).

At #710, the AP 702 responds to the authentication request by sending a management frame including an authentication response to the STA 704. In some examples, this authentication response indicates the success or failure of the authentication (e.g., whether the STA 704 has the capability to access the BSS).

If the STA 704 is authenticated at #710, at #712 the STA 704 sends a management frame including an association request to the AP 702 to establish an association with the BSS. In some examples, the association request may include one or more capabilities of the STA 704.

At #714, the AP 702 responds to the association request by sending a management frame including an association response to the STA 704. In some examples, this association response includes an association identifier (AID) that the AP 702 assigns to the STA 704.

Once the STA 704 successfully completes the authentication and association operations, the AP 702 and the STA 704 may commence communicating user traffic. For example, at #716, the AP 702 may transmit downlink (DL) transmissions including various frames (e.g., management frames, control frames, data frames, etc.) to the STA 704 on one or more of the RF channels supported by the AP 702. Similarly, at #718, the STA 704 may transmit uplink (UL) transmissions including various frames (e.g., management frames, control frames, data frames, etc.) to the AP 702 on one or more of the RF channels supported by the AP 702.

In some scenarios, devices that transmit over an RF spectrum (e.g., unlicensed RF spectrum and/or shared RF spectrum) may use a collision avoidance scheme to reduce the likelihood that multiple devices will transmit on the same RF spectrum at the same time. One example of such a collision avoidance scheme is a listen-before-talk (LBT) procedure. In general, before a first device transmits on a particular RF spectrum, the first device may perform a clear channel assessment (CCA) procedure that involves listening for any transmissions by any other devices on that RF spectrum. If the RF spectrum is currently being used, the first device may back-off for a period of time and then re-attempt transmission (e.g., by listening for other transmissions again). Carrier sense multiple access (CSMA) with random backoff is one example of an LBT procedure. Other types of LBT procedures may be used as well.

As mentioned above, an apparatus such as the AP 702 and the STA 704 may communicate information using a data unit. A data unit may take different forms in different implementations. In some examples, a data unit may be a frame for wireless communication. In some examples, a data unit may be a Physical Layer Convergence Protocol (PLCP) Protocol Data Unit (PPDU) for Wi-Fi communication. In some examples, a data unit may be an IEEE 802.11 frame (e.g., an IEEE 802.11ac frame, an IEEE 802.11ax frame, etc.). Other examples of data units for wireless communication are possible.

Figure 8:
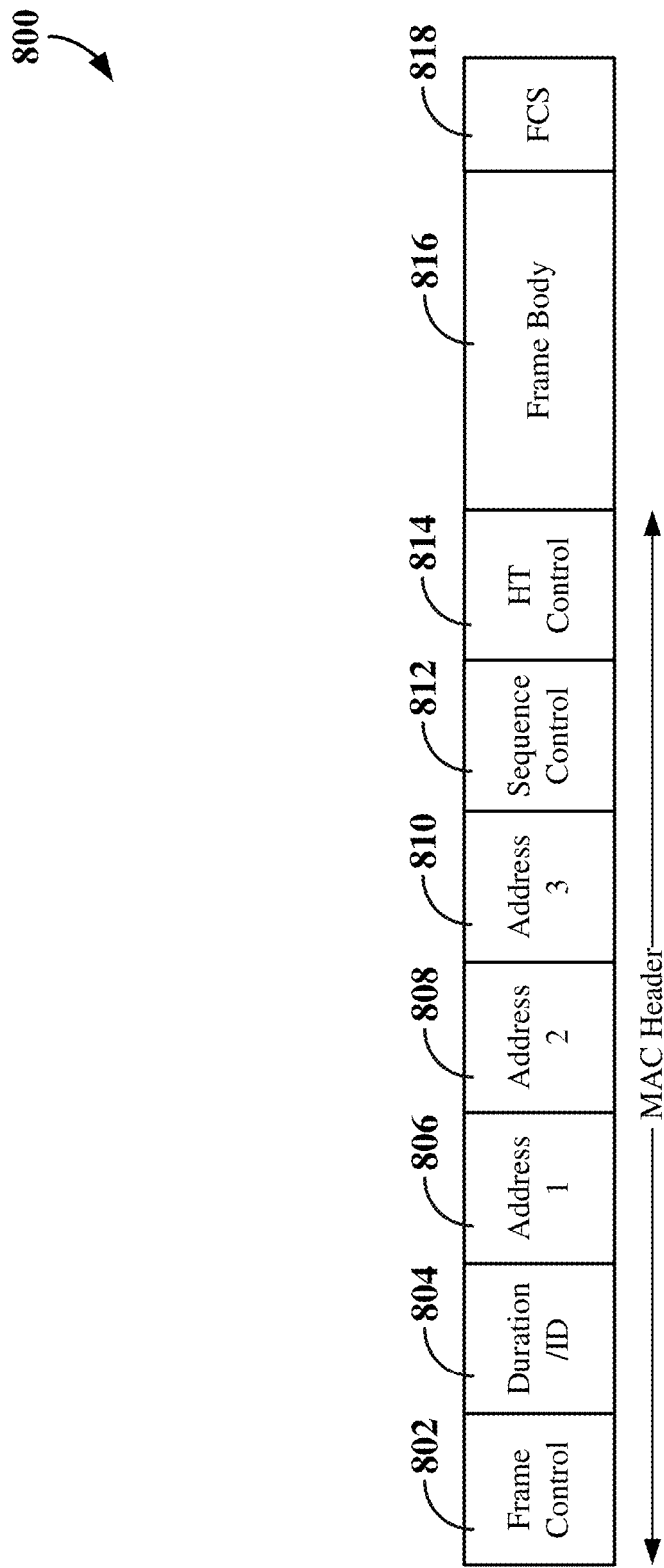
FIG. 8 is a conceptual illustration of an example of a frame format according to some aspects.

FIG. 8 illustrates an example of a MAC frame 800 that may be send via a PPDU. In some examples, the MAC frame 800 may be a management frame (e.g., a frame that is used to manage a basic service set). In some examples, a management frame may be an action frame (e.g., a frame that triggers an action).

The MAC frame 800 includes a frame control field 802, a duration/ID field 804, a first address field 806, a second address field 808, a third address field 810, a sequence control field 812, a high throughput (HT) control field 814, a frame body field 816 (e.g., for a data payload), and a frame check sequence (FCS) field 818. Other types of MAC frames and/or other types of fields may be used in other examples.

In some examples, the frame control field 802 carries an indication of the associated frame type. For example, this indication may specify whether the frame is a management frame, a control frame, or a data frame.

In some examples, the duration/ID field 804 carries the AID of the associated STA. For example, for a frame sent by a STA, the AID may be the AID of that STA. Similarly, for a frame sent to a STA, the AID may be the AID of that STA.

In some examples, the address fields include MAC addresses corresponding to a source address (SA), a destination address (DA), a transmitting STA address (TA), and a receiving STA address (RA) for the frame. Here, the STA for the TA and the RA may refer to an AP STA or a non-AP STA.

In some examples, the sequence control field 812 carries a sequence number (SN). The SN may be incremented with every subsequent frame transmission in a given session. Thus, the SN may be used, for example, to reorder a sequence of frames (e.g., one frame has sequence number 1, the next frame has sequence number 2, and so on) that may have been received out of order.

In some examples, an IEEE 802.11-based network or some other type of network (e.g., a local area network, a personal area network, etc.) may incorporate low-power devices. For example, a low-power device may be powered by a power source that has a relatively low capacity. In some examples, such a power source may take the form of a relatively small battery (e.g., a coin cell battery, etc.) or some other type of power-limited power source (e.g., a solar-based power source, an inertia-based power source, etc.).

In some examples, a power-limited power source may have an internal resistance that negatively affects the capability of the power source to maintain a consistent output level when a power drain occurs for a period of time. For example, a battery may experience a droop in the output voltage level when a certain amount of power is drawn from the battery for a certain period of time.

In some cases, the output level of such a power source may recover (e.g., rise back up) once the power drain is stopped or reduced by a certain extent. In some examples, it may take a period of time for the output level of the power source to recover back to its original level or to a level below the original level.

In some examples of a low-power device, the device's transceiver and associated components may consume the most power of all of the components of the device. For example, a transmit power amplifier of the device may consume much more power than a processing system of the device. In such a case, transmissions by the device may lead to a droop in the output level of the power source for the device.

For example, during power intensive Wi-Fi transmissions by a Wi-Fi device, the voltage level of a coin cell battery voltage may droop to very low levels and take a nonsignificant amount of time to recover. Attempting multiple transmissions in the presence of a significant voltage droop can lead to situations where the battery voltage level is too low, thereby negatively impacting the operation of the Wi-Fi device.

Figure 9:
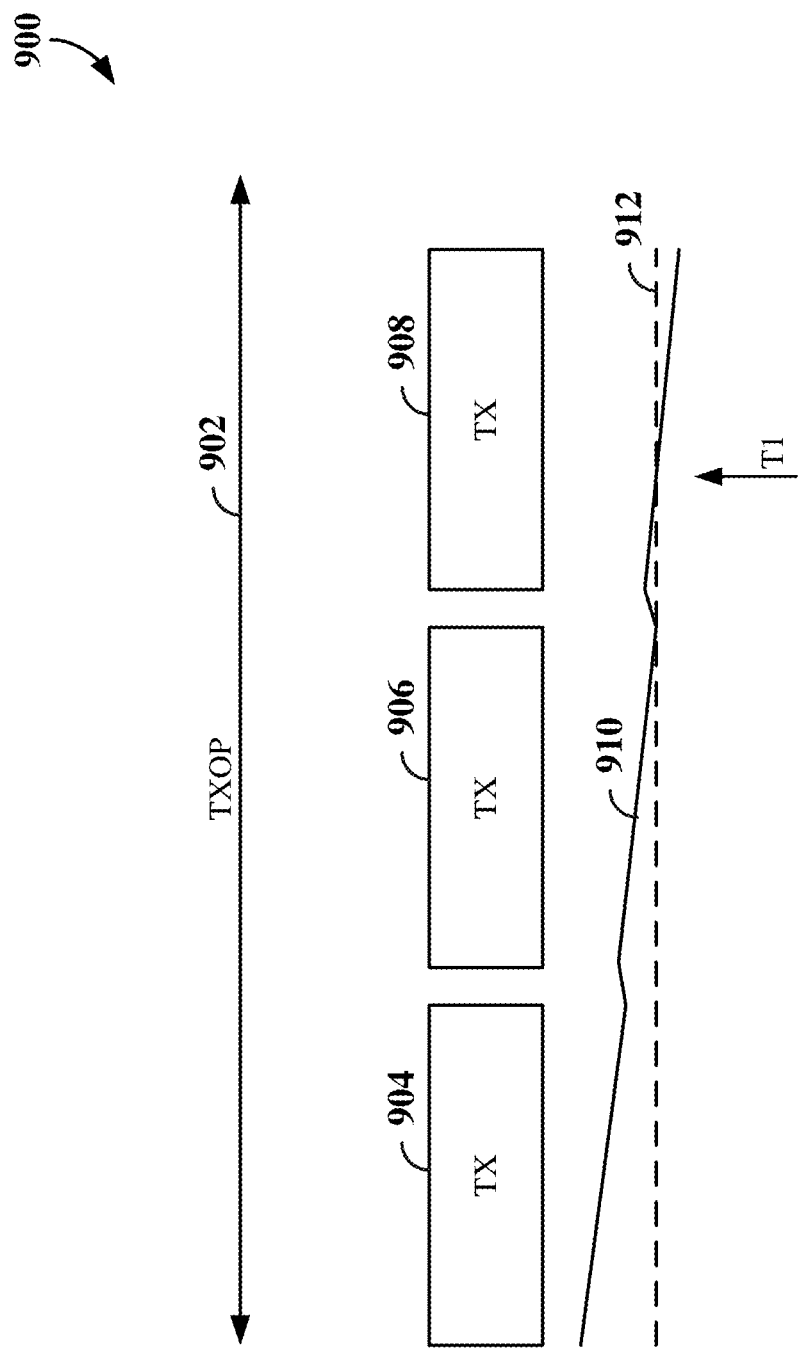
FIG. 9 is a conceptual illustration of an example of a voltage level of a power source during a transmission opportunity according to some aspects.

FIG. 9 illustrates an example 900 of a droop in a battery voltage level due to transmissions by a device (not shown). In this example, the device has acquired a channel (e.g., via an LBT procedure) for a period of time, referred to as a transmission opportunity (TXOP) 902. In this case, the device has scheduled a first packet transmission 904, a second packet transmission 906, and a third packet transmission 908 during the TXOP 902. The packet transmissions are separated in time by defined time intervals (e.g., interframe spacings).

FIG. 9 further illustrates that the output voltage level 910 of the battery of the device droops due to each of the first packet transmission 904, the second packet transmission 906, and the third packet transmission 908. As shown, the output voltage level 910 may recover somewhat when there are no transmissions (e.g., during the interframe spacings). However, the relatively short amount of time between transmissions is not sufficient enough to stop the progressive drop in the output voltage level 910.

In this example, at a point in time T1, the output voltage level 910 drops below a threshold level 912 due to the successive transmissions. In some examples, the threshold level 912 may represent a safe operating level, below which the functionality of the device may be compromised due to the low voltage supplied to the components of the device. For example, the transceiver of the device might not operate properly when the output voltage level 910 is below the threshold level 912. Thus, in the example of FIG. 9, the third packet transmission 908 may fail.

The disclosure relates in some aspects to detecting the battery voltage level of a device and suspending a transmission if the battery voltage level falls below a threshold level. For example, a Wi-Fi device may detect the battery voltage level during an active Wi-Fi TXOP and abort the TXOP in the event the battery voltage level drops below a configurable level. By aborting the TXOP, the battery voltage level is able to recover before a subsequent transmission in another TXOP.

Figure 10:
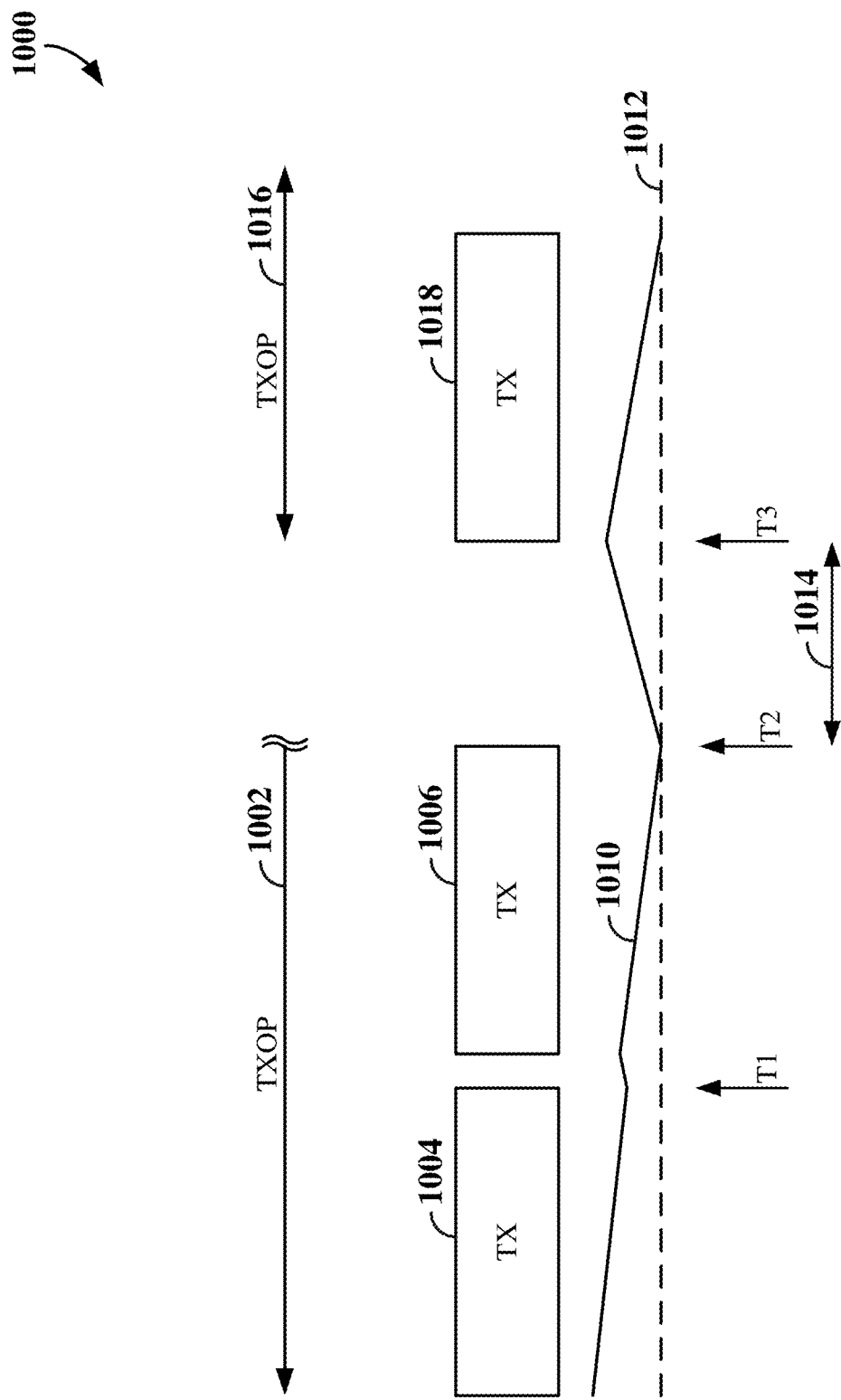
FIG. 10 is a conceptual illustration of an example of suspending a transmission according to some aspects.

FIG. 10 illustrates an example 1000 of a TXOP suspension due to a droop in a battery voltage level. In this example, the device has acquired a channel (e.g., via an LBT procedure) for a first TXOP 1002. The device has scheduled multiple packet transmissions during the first TXOP 1002, including a first packet transmission 1004 and second packet transmission 1006.

As shown in FIG. 10, the output voltage level 1010 of the battery of the device droops due to each of the first packet transmission 1004 and the second packet transmission 1006. At a point in time T1 (e.g., at or near the end of the first packet transmission 1004), the device may determine that the output voltage level 1010 is above a threshold level 1012 and proceed with the second packet transmission 1006. At a point in time T2 (e.g., at or near the end of the second packet transmission 1006), the device may determine that the output voltage level 1010 is at or below the threshold level 1012. In some examples, the threshold level 1012 may be defined to be somewhat higher than the level that results in unsafe operation of the device (e.g., the threshold level 1012 may incorporate a safety margin).

Upon determining that the output voltage level 1010 is at or below the threshold level 1012, the device aborts the first TXOP 1002. Then device may then wait a period of time 1014 before acquiring the channel for a second TXOP 1016 at a point in time T3. For example, the device may determine whether the channel is available for the second TXOP 1016 by performing an LBT procedure such as a CSMA/random backoff procedure (e.g., back-off of the channel for a random period of time and then perform a CCA procedure). If the channel is available (e.g., an LBT procedure is successful), the device transmits the third transmission 1018 during the second TXOP 1016.

Figure 11:
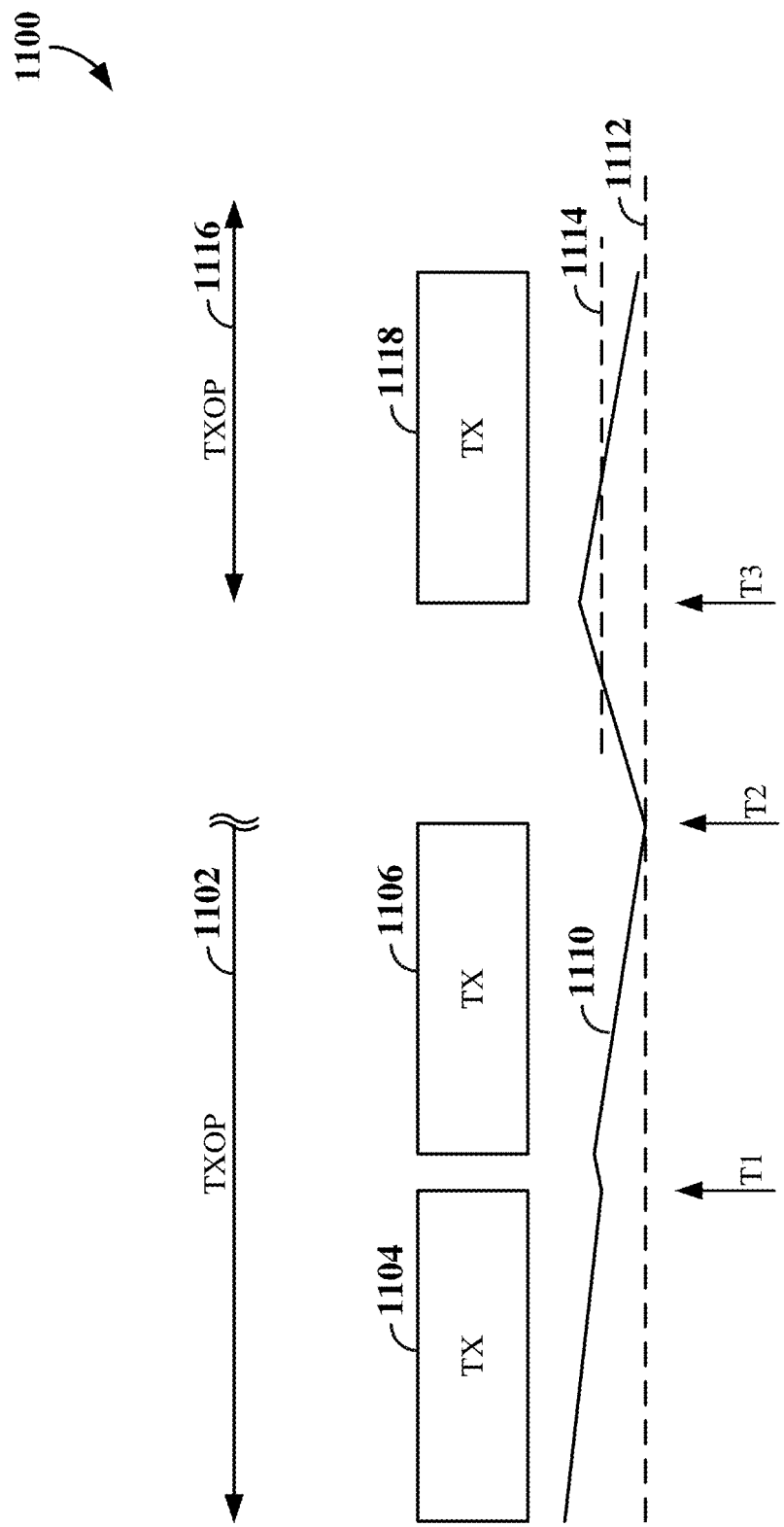
FIG. 11 is a conceptual illustration of another example of suspending a transmission according to some aspects.

FIG. 11 illustrates an example 1100 where a device verifies that the battery voltage level meets a threshold level before commencing a suspended transmission. In this example, the device has acquired a channel (e.g., via an LBT procedure) for a first TXOP 1102. The device has scheduled multiple packet transmissions during the first TXOP 1102, including a first packet transmission 1104 and second packet transmission 1106.

As shown in FIG. 11, the output voltage level 1110 of the battery of the device droops due to each of the first packet transmission 1104 and the second packet transmission 1106. At a point in time T1 (e.g., at or near the end of the first packet transmission 1104), the device may determine that the output voltage level 1110 is above a first threshold level 1112 and proceed with the second packet transmission 1106. At a point in time T2 (e.g., at or near the end of the second packet transmission 1106), the device may determine that the output voltage level 1110 is at or below the first threshold level 1112.

Upon determining that the output voltage level 1110 is at or below the first threshold level 1112, the device aborts the first TXOP 1102. Then device may then wait until the output voltage level 1110 is at or above a second threshold level 1114 before acquiring the channel for a second TXOP 1116 at a point in time T3. Once the device determines that the output voltage level 1110 is at or above the second threshold level 1114, the device may perform a CCA procedure to determine whether to reacquire the channel for the second TXOP 1116. If the channel is clear (e.g., an LBT procedure is successful), the device transmits the third transmission 1118 during the second TXOP 1116.

The thresholds discussed above may take different forms in different examples. In some examples, a threshold may correspond to a certain voltage level. In some examples, a threshold may depend on the type of battery used to power a device (e.g., the nominal voltage level of the battery, such as 3 volts, etc.).

In some examples, a threshold may depend on the life cycle of a battery. For example, a coin cell specification may state that a battery such as a CR 2032 battery will die at 2 volts. Thus, a threshold may be based on this value. However, in some cases, a device may still function properly even when such a battery provides a lower voltage (e.g., 1.6 volts) depending on power management unit (PMU) implementation and capability. Thus, a threshold may be based on this lower value. Also, relatively new batteries may be drawn down to lower voltages, while older batteries might not be able to provide the same level of performance. For example, the operating range for a new battery may be 1.6 volts-3.3 volts, while the operating range for an older battery may be 2.0 volts-3.3 volts. Thus, in some examples, threshold programming may be employed whereby the threshold may vary over time and per battery. For example, for a battery with a current operating range of 1.6 volts-3.3 volts, a first threshold (e.g., the first threshold level 1112 of FIG. 12) may be defined to be within the range of 1.8 volts to 2.5 volts while a second threshold (e.g., the second threshold level 1114 of FIG. 12) may be defined to be within the range of 2.0 volts to 2.5 volts.

Figure 12:
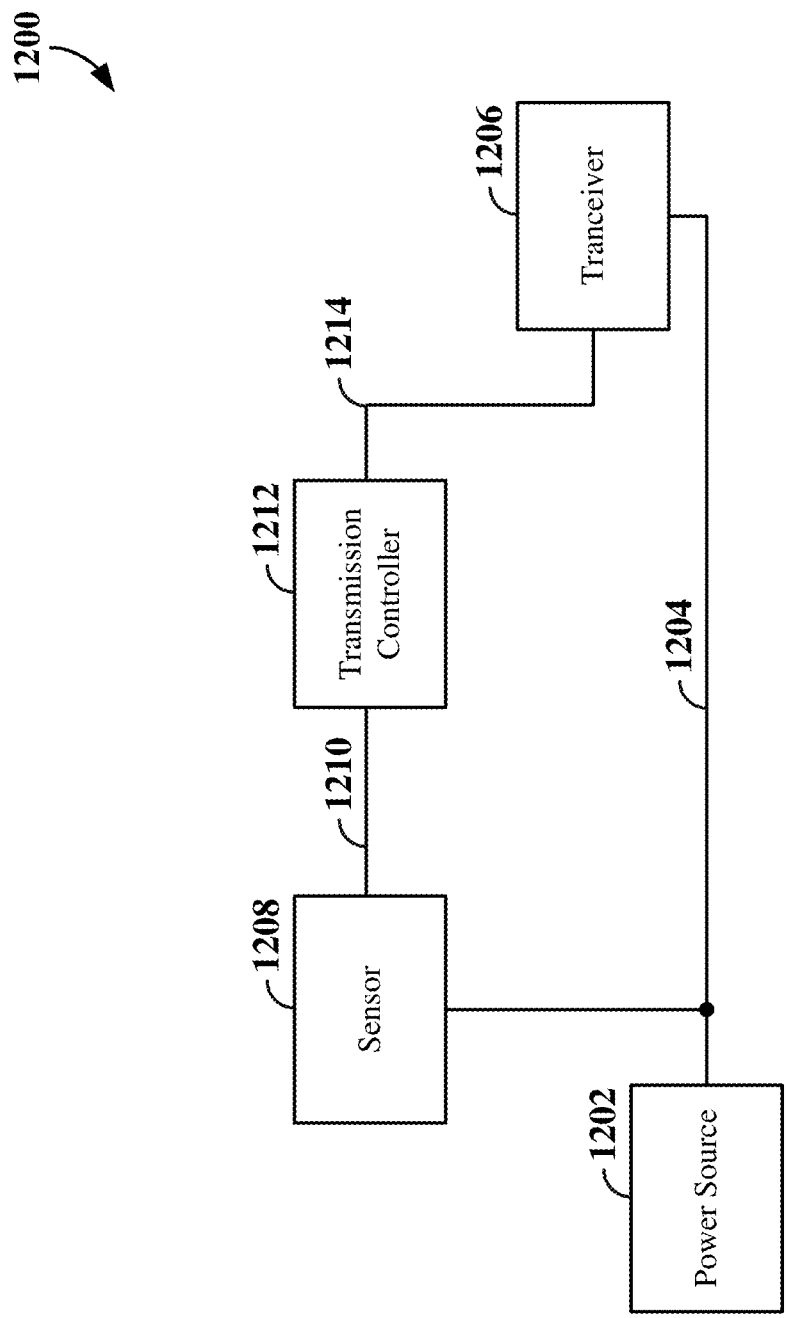
FIG. 12 is a block diagram of an example of power source based transmission control circuitry according to some aspects.

FIG. 12 illustrates an example of components 1200 of a device that may provide at least some of the functionality described herein. A power source 1202 (e.g., a battery) provides power via a power bus 1204 (e.g., including a signal trace, a power plane, wiring, etc.) to a transceiver 1206 and other components of the device. A sensor 1208 is connected to the power bus 1204 to monitor a level of the power output by the power source 1202. For example, the sensor 1208 may measure a voltage level provided by the power source 1202. The sensor 1208 provides information 1210 based on the sensing to a transmission controller 1212. For example, the sensor 1208 may provide an indication of the voltage level or the sensor 1208 may provide an indication of whether the voltage level is above or below a threshold level. The transmission controller 1212 generates signaling 1214 that controls whether a scheduled transmission is to be suspended or transmitted by the transceiver 1206.

Figure 13:
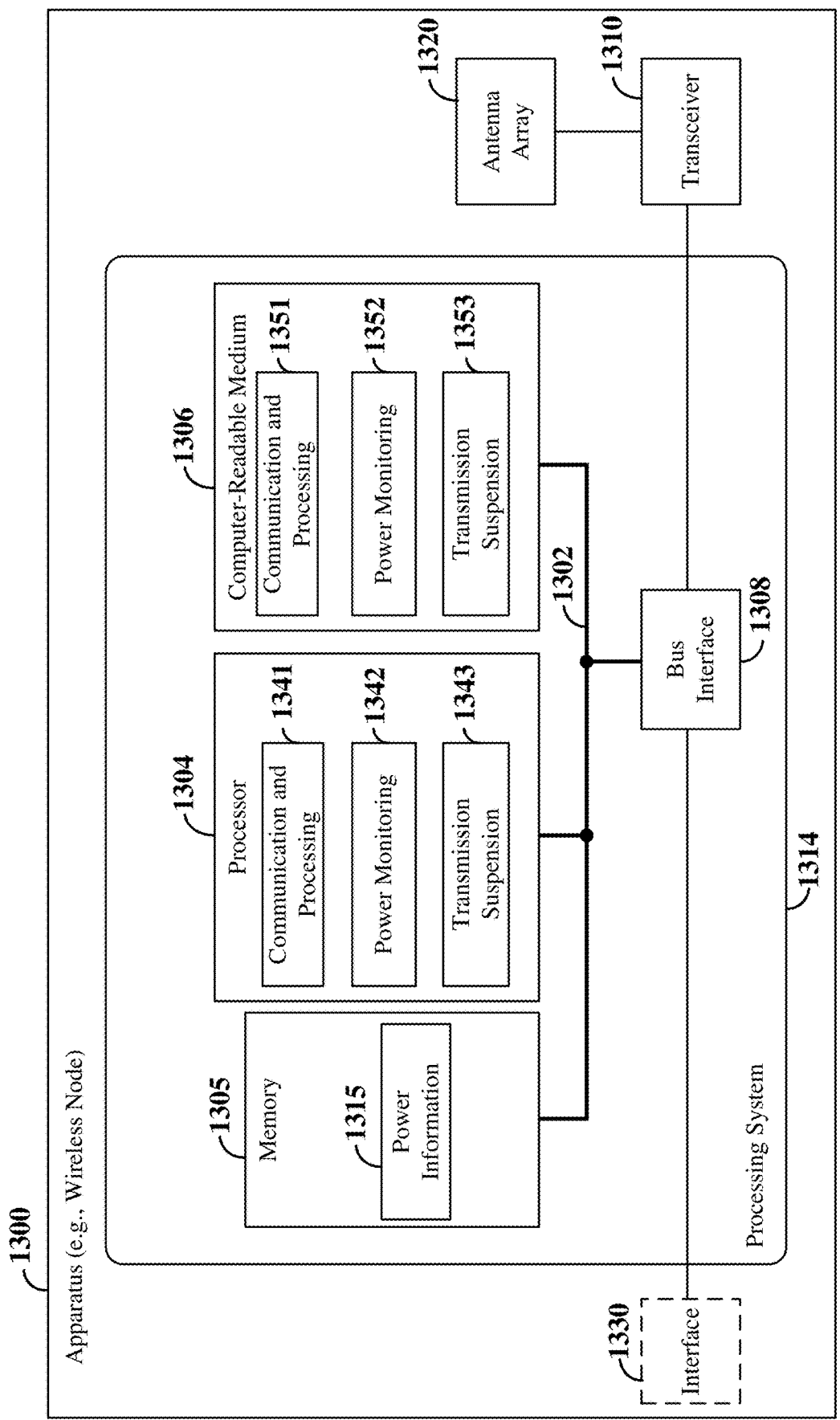
FIG. 13 is a block diagram conceptually illustrating an example of a hardware implementation for an apparatus (e.g., a wireless node such as a wireless communication device) employing a processing system according to some aspects.

FIG. 13 is a block diagram illustrating an example of a hardware implementation for an apparatus 1300 employing a processing system 1314. In some implementations, the apparatus 1300 (e.g., a STA) may correspond to any of the STAs or other apparatuses illustrated in any one or more of FIGS. 1, 2, 3, 6, 7, and 12. In some examples, the apparatus 1300 (e.g., an AP) may correspond to any of the APs or other apparatuses illustrated in any one or more of FIGS. 1, 2, 3, 6, 7, and 12.

In accordance with various aspects of the disclosure, an element, or any portion of an element, or any combination of elements may be implemented with the processing system 1314 (e.g., that includes one or more processors 1304). Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1300 may be configured to perform any one or more of the functions described herein. That is, the processor 1304, as utilized in an apparatus 1300, may be used to implement any one or more of the processes and procedures described below.

The processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the apparatus 1300 or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store power information 1315 (e.g., voltage thresholds, suspension durations, etc.) used by the processor 1304 for communication operations as described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1300 may be configured to perform any one or more of the operations described herein (e.g., as described above in conjunction with FIGS. 1-12 and as described below in conjunction with FIGS. 14-16). In some aspects of the disclosure, the processor 1304, as utilized in the apparatus 1300, may include circuitry configured for various functions.

In implementations where the apparatus 1300 is a station, the processing system 1314 may be configured to monitor RF bands for management frames (e.g., including beacons) from access points, identify an access point to associate with, perform a carrier sense multiple access (CSMA) operation to determine whether at least one RF band is available for use (e.g., relatively free of traffic), and perform an association operation with the identified access point by transmitting an association request to the identified access point on the at least one RF band and receiving an association response from the identified access point on the at least one RF band. The processing system 1314 may also be configured to perform authentication, security, and other operations with the access point via signaling on the at least one RF band. The processing system 1314 may be configured to monitor the at least one RF band for transmissions (e.g., management frames, control frames, and data frames) from the identified access point. The processing system may be configured to perform a CSMA operation on the at least one RF band to transmit a transmission (e.g., control frames, data frames, etc.) to the identified access point.

In implementations where the apparatus 1300 is an access point, the processing system 1314 may be configured to transmit management frames (e.g., including beacons) on designated RF bands. The processing system 1314 may also be configured to monitor the RF bands for transmissions (e.g., association requests) from a STA on at least one RF band. The processing system 1314 may also be configured to associate the STA with the apparatus 1300 by transmitting an association response to the STA on the at least one RF band. The processing system 1314 may also be configured to perform authentication, security, and other operations with the STA via signaling on the at least one RF band. The processing system 1314 may be configured to monitor the at least one RF band for transmissions (e.g., management frames, control frames, and data frames) from the STA. The processing system may be configured to perform a CSMA operation on the at least one RF band to transmit a transmission (e.g., management frames, control frames, data frames, etc.) to the STA.

The processor 1304 may include communication and processing circuitry 1341. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains, each configured to process signals in a different RAT (or RAN) type. The communication and processing circuitry 1341 may further be configured to execute communication and processing software 1351 included on the computer-readable medium 1306 to implement one or more functions described herein.

In some implementations where the communication involves obtaining (e.g., receiving) information, the communication and processing circuitry 1341 may obtain information from a component of the apparatus 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for obtaining (e.g., obtaining a message from another device). In some examples, the communication and processing circuitry 1341 and/or the transceiver 1310 may include functionality for a means for receiving (e.g., receiving a message via RF signaling). In some examples, the communication and processing circuitry 1341 may include functionality for a means for decoding.

In some implementations where the communication involves outputting (e.g., sending) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for outputting (e.g., outputting a message to another device). In some examples, the communication and processing circuitry 1341 and/or the transceiver 1310 may include functionality for a means for transmitting (e.g., transmitting a message via RF signaling). In some examples, the communication and processing circuitry 1341 may include functionality for a means for encoding.

The communication and processing circuitry 1341 and/or the transceiver 1310 may include functionality for a means for outputting a packet for transmission. For example, the communication and processing circuitry 1341 may be configured to generate a frame and output the frame for transmission on one or more designated RF bands (e.g., on one or more channels associated with a BSS). In some examples, the frame may carry information such as MAC addresses, a payload, and so on.

The processor 1304 may include power monitoring circuitry 1342 configured to perform power monitoring-related operations as discussed herein. The power monitoring circuitry 1342 may be configured to execute power monitoring software 1352 included on the computer-readable medium 1306 to implement one or more functions described herein.

The power monitoring circuitry 1342 may include functionality for a means for determining whether a voltage level meets a threshold. For example, the power monitoring circuitry 1342 may be configured to obtain a measurement of a volage level and compare the measurement to a threshold. The power monitoring circuitry 1342 may then generate an indication of whether the voltage level is greater than or equal to the threshold (or less than or equal to the threshold).

The processor 1304 may include transmission suspension circuitry 1343 configured to perform transmission suspension-related operations as discussed herein. The transmission suspension circuitry 1343 may be configured to execute transmission suspension software 1353 included on the computer-readable medium 1306 to implement one or more functions described herein.

The transmission suspension circuitry 1343 may include functionality for a means for suspending a packet from being output for transmission. For example, the transmission suspension circuitry 1343 may be configured to terminate a TXOP in the event a voltage level of a battery is below a threshold level.

The transmission suspension circuitry 1343 may include functionality for a means for conducting a clear channel assessment. For example, the transmission suspension circuitry 1343 may be configured to cooperate with the communication and processing circuitry 1341 and/or the transceiver 1310 to monitor a channel for transmissions by other devices.

The transmission suspension circuitry 1343 may include functionality for a means for resuming transmission of a packet. For example, the transmission suspension circuitry 1343 may be configured to schedule a new TXOP for the transmission.

Figure 14:
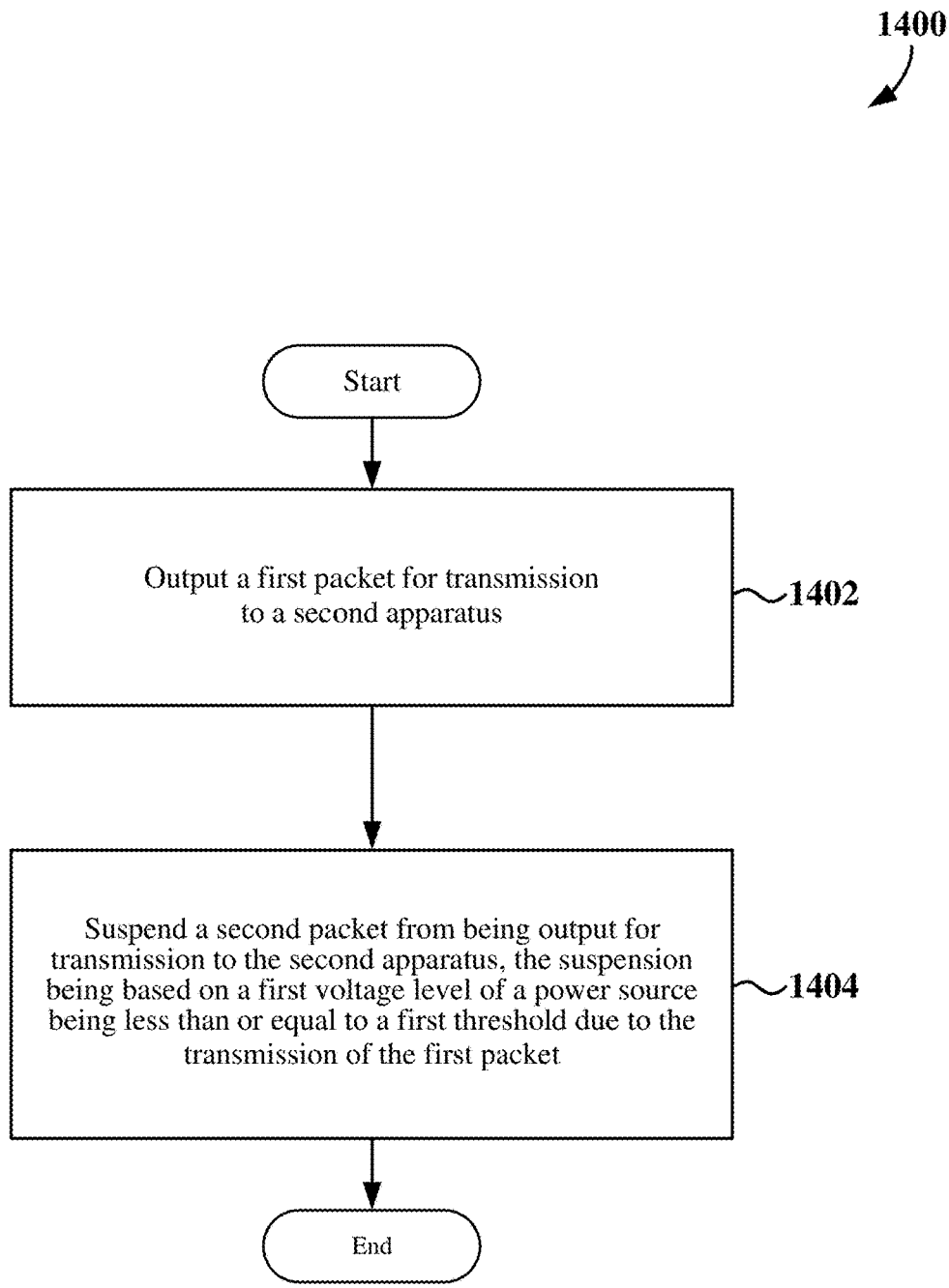
FIG. 14 is a flow chart illustrating an example communication method involving suspending a packet according to some aspects.

FIG. 14 is a flow chart illustrating an example method 1400 for communication in accordance with some aspects of the present disclosure. As described below, some or all illustrated features may be omitted in a particular implementation within the scope of the present disclosure, and some illustrated features may not be required for implementation of all examples. In some examples, the method 1400 (e.g., a method for wireless communication at a first apparatus) may be carried out by the apparatus 1300 (e.g., a first apparatus for wireless communication) illustrated in FIG. 13. In some examples, the method 1400 may be carried out by the apparatus 602 illustrated in FIG. 6. In some examples, the method 1400 may be performed by an access point or a STA. In some examples, the method 1400 may be carried out by any suitable apparatus or means for carrying out the functions or algorithm described below.

At block 1402, the first apparatus may output a first packet for transmission to a second apparatus. For example, the communication and processing circuitry 1341 and/or the transceiver 1310, shown and described above in connection with FIG. 13, may provide a means to output a first packet for transmission to a second apparatus.

At block 1404, a first apparatus may suspend a second packet from being output for transmission to the second apparatus, the suspension being based on a first voltage level of a power source being less than or equal to a first threshold due to the transmission of the first packet. For example, the transmission suspension circuitry 1343 and/or the communication and processing circuitry 1341 and the transceiver 1310, shown and described above in connection with FIG. 13, may provide a means to suspend a second packet from being output for transmission to the second apparatus, the suspension being based on a first voltage level of a power source being less than or equal to a first threshold due to the transmission of the first packet.

Figure 15:
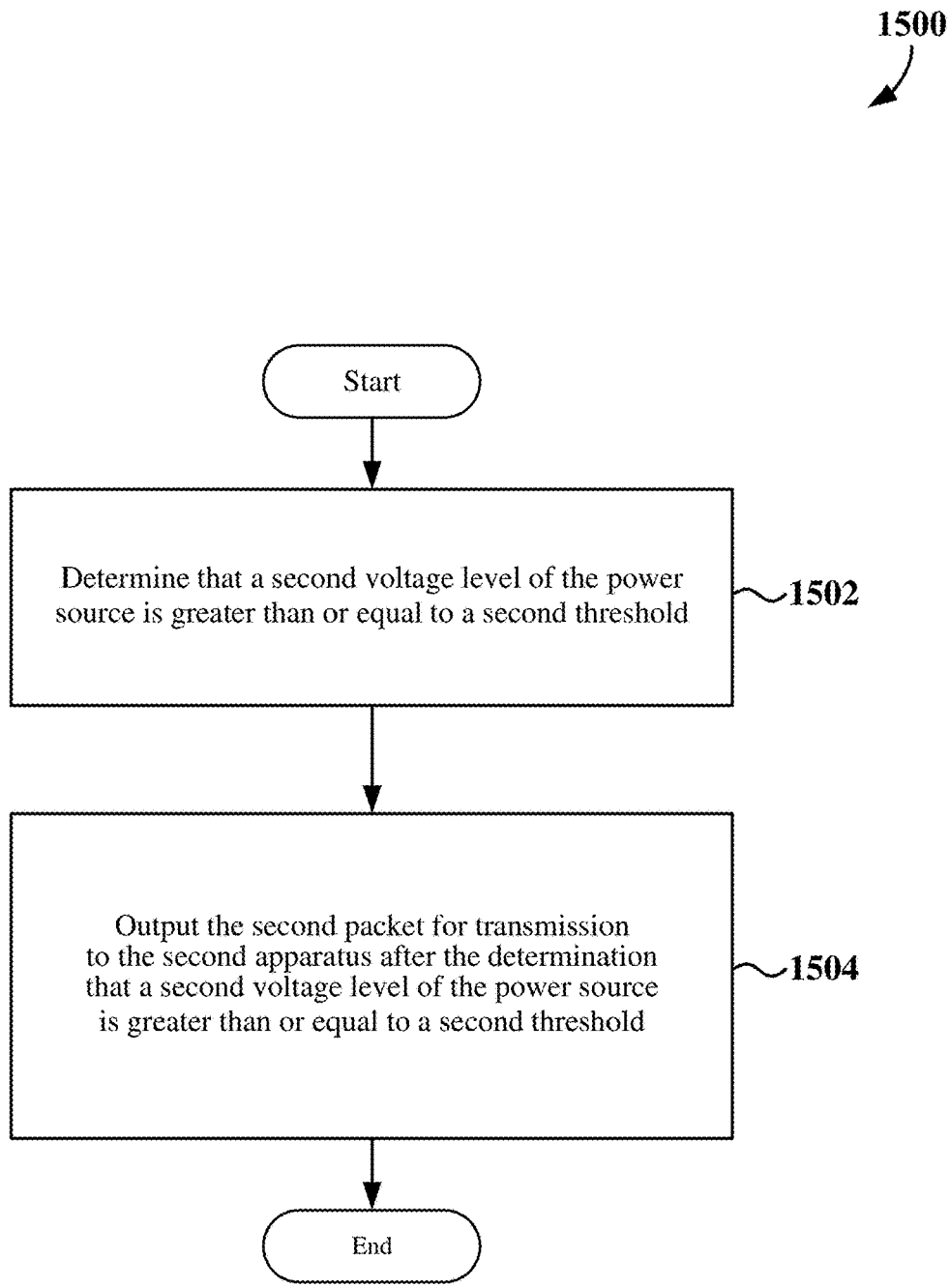
FIG. 15 is a flow chart illustrating an example communication method involving outputting a packet for transmission based on a threshold according to some aspects.

FIG. 15 is a flow chart illustrating an example method 1500 for communication in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the apparatus 1300 illustrated in FIG. 13. In some examples, the method 1500 may be carried out by the apparatus 602 illustrated in FIG. 6. In some examples, the method 1500 may be performed by an access point or a STA. In some examples, the method 1500 may be carried out by any suitable apparatus or means for carrying out the functions or algorithm described below.

At block 1502, a first apparatus may determine that a second voltage level of the power source is greater than or equal to a second threshold. For example, the power monitoring circuitry 1342, shown and described above in connection with FIG. 13, may provide a means to determine that a second voltage level of the power source is greater than or equal to a second threshold.

At block 1504, the first apparatus may output the second packet for transmission to the second apparatus after the determination that a second voltage level of the power source is greater than or equal to a second threshold. For example, the transmission suspension circuitry 1343 and/or the communication and processing circuitry 1341 and/or the transceiver 1310, shown and described above in connection with FIG. 13, may provide a means to output the second packet for transmission to the second apparatus after the determination that a second voltage level of the power source is greater than or equal to a second threshold.

Figure 16:
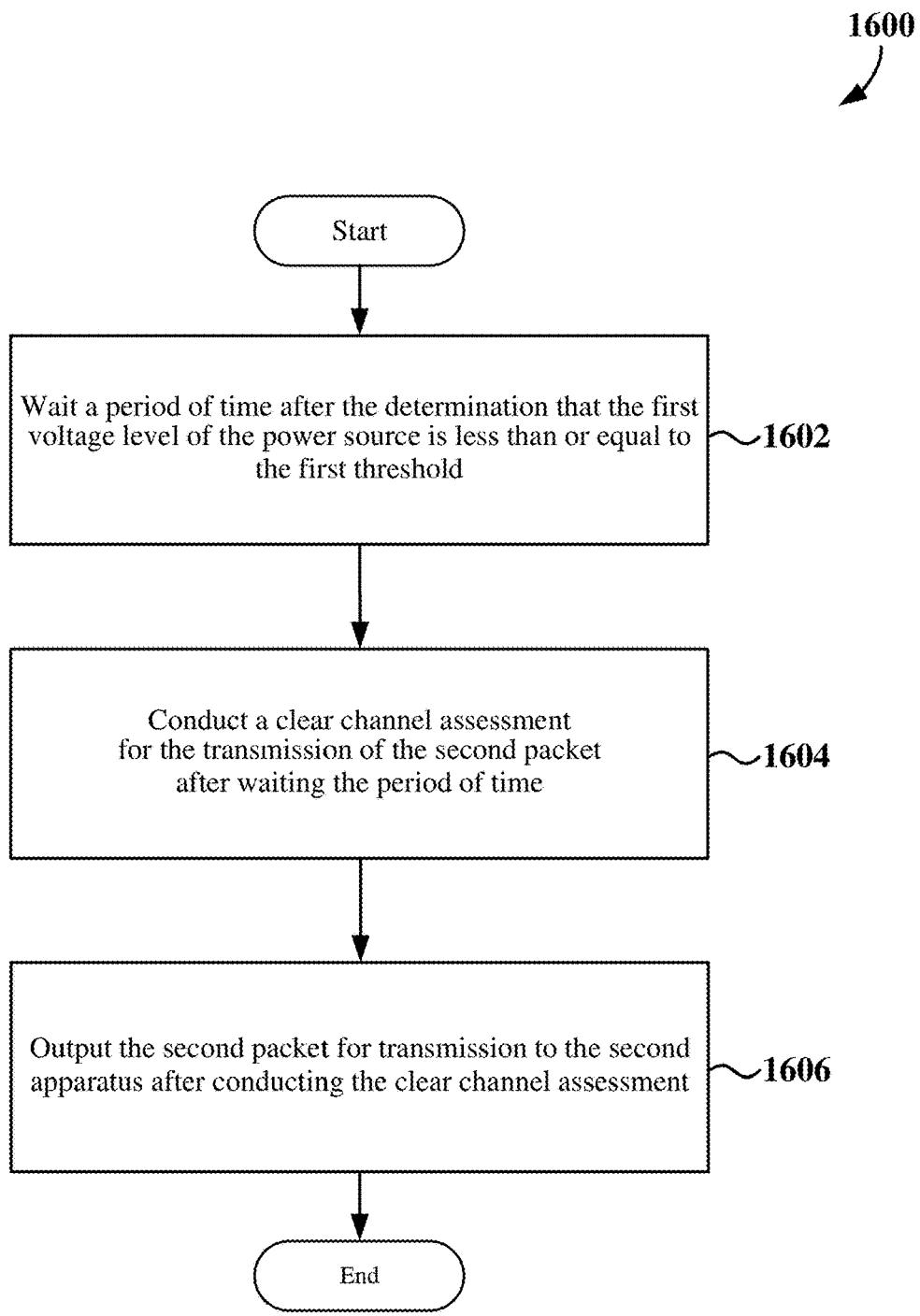
FIG. 16 is a flow chart illustrating an example communication method involving outputting a packet for transmission based on a period of time according to some aspects.

FIG. 16 is a flow chart illustrating an example method 1600 for communication in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the apparatus 1300 illustrated in FIG. 13. In some examples, the method 1600 may be carried out by the apparatus 602 illustrated in FIG. 6. In some examples, the method 1600 may be performed by an access point or a STA. In some examples, the method 1600 may be carried out by any suitable apparatus or means for carrying out the functions or algorithm described below.

At block 1602, a first apparatus may wait a period of time after the determination that the first voltage level of the power source is less than or equal to the first threshold. For example, the transmission suspension circuitry 1343 and/or the communication and processing circuitry 1341 and/or the transceiver 1310, shown and described above in connection with FIG. 13, may provide a means to wait a period of time after the determination that the first voltage level of the power source is less than or equal to the first threshold.

At block 1604, the first apparatus may conduct a clear channel assessment for the transmission of the second packet after waiting the period of time. For example, the transmission suspension circuitry 1343 and/or the communication and processing circuitry 1341 and/or the transceiver 1310, shown and described above in connection with FIG. 13, may provide a means to conduct a clear channel assessment for the transmission of the second packet after waiting the period of time.

At block 1606, the first apparatus may output the second packet for transmission to the second apparatus after conducting the clear channel assessment. For example, the transmission suspension circuitry 1343 and/or the communication and processing circuitry 1341 and/or the transceiver 1310, shown and described above in connection with FIG.

13, may provide a means to output the second packet for transmission to the second apparatus after conducting the clear channel assessment.

In some examples, the first threshold corresponds to a voltage level within a range of 1.8 volts to 2.5 volts.

In some examples, the first apparatus may output the second packet for transmission to the second apparatus after a determination that a second voltage level of the power source is greater than or equal to a second threshold. In some examples, the second threshold is different from the first threshold. In some examples, the first packet is output for transmission to the second apparatus during a first transmission opportunity. In some examples, the second packet is output for transmission to the second apparatus during a second transmission opportunity. In some examples, the second threshold corresponds to a voltage level within a range of 2.0 volts to 2.5 volts.

In some examples, the suspension may include waiting a period of time after a determination that the first voltage level of the power source is less than or equal to the first threshold. In some examples, the first apparatus may conduct a clear channel assessment after waiting the period of time. In some examples, the first apparatus may output the second packet for transmission to the second apparatus after conducting the clear channel assessment.

In some examples, the power source may include (e.g., may be) a battery. In some examples, the power source may include (e.g., may be) a coin cell battery.

In some examples, the power source has a capacity of less than 500 milliampere hours. In some examples, a first maximum power consumption of a transceiver associated with the first apparatus is greater than a second maximum power consumption of a processing system associated with the first apparatus.

Referring again to FIG. 13, in one configuration, the apparatus 1300 includes means for outputting a first packet for transmission to a second apparatus, and means for suspending a second packet from being output for transmission to the second apparatus, the suspension being based on a first voltage level of a power source being less than or equal to a first threshold due to the transmission of the first packet. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 3, 4, 5, 6, 7, and 13, and utilizing, for example, the methods and/or algorithms described herein in relation to FIGS. 14-16.

Aspect 1: A method for wireless communication at a first apparatus (e.g., a station), the method comprising: outputting a first packet for transmission to a second apparatus; and suspending a second packet from being output for transmission to the second apparatus, the suspension being based on a first voltage level of a power source being less than or equal to a first threshold due to the transmission of the first packet.

Aspect 2: The method of aspect 1, wherein the first threshold corresponds to a voltage level within a range of 1.8 volts to 2.5 volts.

Aspect 3: The method of any of aspects 1 through 2, further comprising: outputting the second packet for transmission to the second apparatus after a determination that a second voltage level of the power source is greater than or equal to a second threshold.

Aspect 4: The method of aspect 3, wherein the second threshold is different from the first threshold.

Aspect 5: The method of any of aspects 3 through 4, wherein the second threshold corresponds to a voltage level within a range of 2.0 volts to 2.5 volts.

Aspect 6: The method of any of aspects 3 through 5, wherein: the first packet is output for transmission to the second apparatus during a first transmission opportunity; and the second packet is output for transmission to the second apparatus during a second transmission opportunity.

Aspect 7: The method of any of aspects 1 through 6, wherein the suspension comprises: waiting a period of time after a determination that the first voltage level of the power source is less than or equal to the first threshold.

Aspect 8: The method of aspect 7, further comprising: conducting a clear channel assessment after waiting the period of time; and outputting the second packet for transmission to the second apparatus after conducting the clear channel assessment.

Aspect 9: The method of any of aspects 1 through 8, wherein the power source comprises a battery.

Aspect 10: The method of any of aspects 1 through 9, wherein the power source comprises a coin cell battery.

Aspect 11: The method of any of aspects 1 through 10, wherein the power source has a capacity of less than 500 milliampere hours.

Aspect 12: A station, comprising: a power source; at least one transceiver; a memory comprising instructions; and one or more processors configured to execute the instructions and cause the station to perform a method in accordance with any one or more of aspects 1-11, wherein the at least one transceiver is configured to transmit the fourth signal.

Aspect 13: A first apparatus configured for communication comprising at least one means for performing any one or more of aspects 1 through 11.

Aspect 14: A non-transitory computer-readable medium storing computer-executable code, comprising code for causing a first apparatus to perform any one or more of aspects 1 through 11.

Aspect 15: A first apparatus, comprising: a memory comprising instructions; and one or more processors configured to execute the instructions and cause the first apparatus to perform a method in accordance with any one or more of aspects 1-11.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within systems defined by the IEEE 802.11 (Wi-Fi) standards such as 802.11ax, 802.11be, and so on. Various aspects may also be extended to systems defined by the 3rd Generation Partnership Project (3GPP) such 5G, as Long-Term Evolution (LTE), the Evolved Packet System (EPS), the Universal Mobile Telecommunication System (UMTS), and/or the Global System for Mobile (GSM)CDMA2000 and/or Evolution-Data Optimized (EV-DO). Other examples may be implemented within systems employing IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 4, 5, 6, 7, 12, and 13 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first apparatus for wireless communication, the first apparatus comprising:
  a processing system configured to:
    acquire a radio frequency (RF) channel for a first transmission opportunity (TXOP);
    schedule a transmission of a first packet and a transmission of a second packet during the first TXOP;
    output the first packet for transmission to a second apparatus during the first TXOP;
    abort the first TXOP based on a first voltage level of a power source of the first apparatus being less than or equal to a first threshold due to the transmission of the first packet;
    reacquire the RF channel for a second TXOP based on a second voltage level of the power source being greater than a second threshold after the first TXOP is aborted; and
    output the second packet for transmission to the second apparatus during the second TXOP.

2. The first apparatus of claim 1, wherein the first threshold corresponds to a voltage level within a range of 1.8 volts to 2.5 volts.

3. The first apparatus of claim 1, wherein the second threshold is different from the first threshold.

4. The first apparatus of claim 1, wherein the second threshold corresponds to a voltage level within a range of 2.0 volts to 2.5 volts.

5. The first apparatus of claim 1, wherein the processing system is further configured to:
  wait a period of time after a determination that the first voltage level of the power source is less than or equal to the first threshold prior to reacquisition of the RF channel.

6. The first apparatus of claim 5, wherein the processing system is further configured to:
  conduct a clear channel assessment after the period of time; and
  output the second packet for transmission to the second apparatus after conducting the clear channel assessment.

7. A station comprising:
  a power source;
  a transceiver; and
  a processing system configured to:
    acquire a radio frequency (RF) channel for a first transmission opportunity (TXOP);
    schedule a transmission of a first packet and a transmission of a second packet during the first TXOP;
    transmit the first packet to a second apparatus via the transceiver during the first TXOP;

abort the first TXOP based on a first voltage level of the power source being less than or equal to a first threshold due to the transmission of the first packet;

reacquire the RF channel for a second TXOP based on a second voltage level of the power source being greater than a second threshold after the first TXOP is aborted; and transmit the second packet to the second apparatus via the transceiver during the second TXOP.

8. The station of claim 7, wherein the power source comprises a battery.

9. The station of claim 7, wherein the power source comprises a coin cell battery.

10. The station of claim 7, wherein the power source has a capacity of less than 500 milliampere hours.

11. A method for wireless communication at a first apparatus, the method comprising:

acquiring a radio frequency (RF) channel for a first transmission opportunity (TXOP);

scheduling a transmission of a first packet and a transmission of a second packet during the first TXOP;

outputting the first packet for transmission to a second apparatus during the first TXOP;

aborting the first TXOP based on a first voltage level of a power source of the first apparatus being less than or equal to a first threshold due to the transmission of the first packet;

reacquiring the RF channel for a second TXOP based on a second voltage level of the power source being greater than a second threshold after the first TXOP is aborted; and outputting the second packet for transmission to the second apparatus during the second TXOP.

12. The method of claim 11, wherein the second threshold is different from the first threshold.

13. The method of claim 11, further comprising:

waiting a period of time after a determination that the first voltage level of the power source is less than or equal to the first threshold prior to the reacquiring the RF channel.

14. The method of claim 13, further comprising:

conducting a clear channel assessment after waiting the period of time;

wherein the second packet is output for transmission to the second apparatus after conducting the clear channel assessment.

15. The method of claim 11, wherein the power source comprises a battery.

16. The method of claim 11, wherein the power source comprises a coin cell battery.

* * * * *